(12) United States Patent  
Kuma et al.

(10) Patent No.: US 11,948,337 B2  
(45) Date of Patent: Apr. 2, 2024

(54) IMAGE PROCESSING APPARATUS AND METHOD

(71) Applicant: SONY CORPORATION, Tokyo (JP)

(72) Inventors: Satoru Kuma, Tokyo (JP); Ohji Nakagami, Tokyo (JP); Hiroyuki Yasuda, Tokyo (JP); Koji Yano, Tokyo (JP); Tsuyoshi Kato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 329 days.

(21) Appl. No.: 17/278,004

(22) PCT Filed: Sep. 17, 2019

(86) PCT No.: PCT/JP2019/036296  
§ 371 (c)(1),  
(2) Date: Mar. 19, 2021

(87) PCT Pub. No.: WO2020/071101  
PCT Pub. Date: Apr. 9, 2020

(65) Prior Publication Data  
US 2021/0358176 A1 Nov. 18, 2021

(30) Foreign Application Priority Data  
Oct. 1, 2018 (JP) .................................. 2018-186368

(51) Int. Cl.  
*G06T 9/00* (2006.01)  
*G06T 3/00* (2006.01)  
*G06T 17/00* (2006.01)

(52) U.S. Cl.  
CPC ............ *G06T 9/001* (2013.01); *G06T 3/0031* (2013.01); *G06T 17/00* (2013.01)

(58) Field of Classification Search  
CPC ....... G06T 9/001; G06T 3/0031; G06T 17/00; H04N 19/597; H04N 19/70  
See application file for complete search history.

(56) References Cited

U.S. PATENT DOCUMENTS

| 11,699,248 B2* | 7/2023 | Kuma | ................ G06T 9/00 345/419 |
| 2018/0053324 A1 | 2/2018 | Cohen et al. | |

(Continued)

FOREIGN PATENT DOCUMENTS

| EP | 3501005 A1 | 6/2019 |
| WO | 2018/034253 A1 | 2/2018 |
| WO | 2019/055963 A1 | 3/2019 |

OTHER PUBLICATIONS

Mekuria, et al., "Design, Implementation, and Evaluation of a Point Cloud Codec for Tele-Immersive Video", Transactions on Circuits and Systems for Video Technology, IEEE, vol. 27, No. 4, Apr. 2017, pp. 828-842.

(Continued)

*Primary Examiner* — Mekonen T Bekele  
(74) *Attorney, Agent, or Firm* — CHIP LAW GROUP

(57) ABSTRACT

The present disclosure relates to image processing apparatus and method that can prevent a reduction in image quality. Geometry data that is a frame image having arranged thereon a projected image obtained by projecting 3D data representing a three-dimensional structure on a two-dimensional plane and includes a special value indicating occupancy map information in a range is generated. The generated geometry data is encoded. Further, the encoded data on the geometry data is decoded, and a depth value indicating a position of the 3D data and the occupancy map information are extracted from the decoded geometry data. The present disclosure is applicable to, for example, an information processing apparatus, an image processing apparatus, electronic equipment, an information processing method, or a program.

20 Claims, 27 Drawing Sheets

(56) References Cited

U.S. PATENT DOCUMENTS

| 2019/0087978 A1 | 3/2019 | Tourapis et al. |
| 2019/0087979 A1 | 3/2019 | Mammou et al. |
| 2019/0156518 A1 | 5/2019 | Mammou et al. |
| 2019/0156519 A1 | 5/2019 | Mammou et al. |
| 2019/0156520 A1 | 5/2019 | Mammou et al. |

OTHER PUBLICATIONS

International Search Report and Written Opinion of PCT Application No. PCT/JP2019/036296, dated Oct. 15, 2019, 09 pages of ISRWO.

Golla, et al., "Real-time Point Cloud Compression", IEEE/RSJ International Conference on Intelligent Robots and Systems (IROS), Sep. 28-Oct. 2, 2015, pp. 5087-5092.

Jang, et al., "Video-Based Point-Cloud-Compression Standard in MPEG: From Evidence Collection to Committee Draft [Standards in a Nutshell]", IEEE, Signal Processing Magazine, vol. 36, No. 3, May 2019, pp. 118-123.

\* cited by examiner

FIG.1

| | GEOMETRY DATA INCLUDING SPECIAL VALUE INDICATING OCCUPANCY MAP INFORMATION IS GENERATED | | |
|---|---|---|---|
| SPECIAL VALUE IS SET | min | | |
| | max | | |
| | middle | | |
| | OTHERS | | |
| | PLURALITY OF SPECIAL VALUES | | |
| GUARD MARGIN IS SET | TARGET RATE (QP) | | |
| THRESHOLD IS SET | OCCUPANCY MAP IN LOCAL DECODING IS EVALUATED | | |
| DEPTH VALUE IS CORRECTED | QUANTIZATION IS PERFORMED | | |
| | SHIFTING IS PERFORMED | | |
| PARAMETER IS SIGNALED | CONTENT | SPECIAL VALUE | |
| | | GUARD MARGIN | |
| | | THRESHOLD | |
| | DATA UNIT | IN UNITS OF PATCHES | |
| | | IN UNITS OF FRAMES | |
| | | IN UNITS OF SEQUENCES | |
| OCCUPANCY MAP AND GEOMETRY DATA ARE EXTRACTED FROM GEOMETRY DATA INCLUDING SPECIAL VALUE INDICATING OCCUPANCY MAP INFORMATION | | | |
| EXTRACTION BASED ON PARAMETER IS PERFORMED | SPECIAL VALUE | | |
| | GUARD MARGIN | | |
| | THRESHOLD | | |
| DEPTH VALUE IS INVERSELY CORRECTED | QUANTIZATION IS PERFORMED | | |
| | SHIFTING IS PERFORMED | | |

FIG. 3

```
If(!occupied) {
    Depth = special value
}

The occupied is decided by target and near occupation.
```

51: Occupancy map is generated.
If(d is smaller than guard margin/X)
    occupancy map = 0
Else
    occupancy map = 1

52: Points in guard margin is corrected.
If(occupancy map == 1)
    d = max(d, guard margin)

FIG. 6

61 parameters is signaled as level of sequence, frame and patch

Parameters is as follows.
- Special value index.
- Guard margin value.
- Threshold X

FIG. 8

81: Points in guard margin is corrected.
If(d is smaller than guard margin/X)
  d = 0
Else
  d = guard margin 82: Occupancy map is generated.
If(d is smaller than guard margin/X)
  occupancy map = 0
Else
  occupancy map = 1

FIG. 10

101
Occupancy map is generated.
If(d is larger than max - guard margin/X)
    occupancy map = 0
Else
    occupancy map = 1

102
Points in guard margin is corrected.
If(occupancy map == 1)
    d = min(d, max - guard margin)

FIG. 12

121
```
Occupancy map is generated.
If(|d -special value| < guard margin/X)
    occupancy map = 0
Else
    occupancy map = 1
```

122
```
Points in guard margin is corrected.
If(occupancy map == 1)
    If (d > special value)
        d = max(d,guard margin)
    Else
        d = min(d,max - guard margin)
```

IMAGE PROCESSING APPARATUS AND METHOD

CROSS REFERENCE TO RELATED APPLICATIONS

This application is a U.S. National Phase of International Patent Application No. PCT/JP2019/036296 filed on Sep. 17, 2019, which claims priority benefit of Japanese Patent Application No. JP 2018-186368 filed in the Japan Patent Office on Oct. 1, 2018. Each of the above-referenced applications is hereby incorporated herein by reference in its entirety.

TECHNICAL FIELD

The present disclosure relates to image processing apparatus and method, in particular, to image processing apparatus and method that can prevent a reduction in image quality.

BACKGROUND ART

Hitherto, as an encoding method for 3D data representing a three-dimensional structure such as a point cloud, there has been encoding using voxels such as octrees (for example, see NPL In recent years, as another encoding method, for example, there has been proposed a method that projects position information and attribute information regarding a point cloud on a two-dimensional plane in units of subregions, arranges images (patches) projected on the two-dimensional plane on frame images, and encodes the frame images by a two-dimensional image encoding method (hereinafter also referred to as a "video-based approach").

In such a 3D data encoding method, hitherto, an occupancy map for determining, with regard to the position information projected on the two-dimensional plane, the presence or absence of depth values (Depth) corresponding to position information regarding the 3D data in the subregions in units of N×N pixels of the above-mentioned frame image is defined and described in a bitstream.

CITATION LIST

Non Patent Literature

[NPL 1]
R. Mekuria, Student Member IEEE, K. Blom, P. Cesar., Member, IEEE, "Design, Implementation and Evaluation of a Point Cloud Codec for Tele-Immersive Video," tcsvt_paper_submitted_february.pdf

SUMMARY

Technical Problem

However, the occupancy map, which is generated as data in units of N×N pixels as described above, has a resolution lower than the frame image resolution, that is, the depth value resolution. Thus, in a case where the 3D data is reconstructed from the frame image using the occupancy map, there is a fear that, due to the low resolution of the occupancy map, the quality of the 3D data (that is, the image quality of a display image obtained by projecting the 3D data on a two-dimensional plane) is reduced.

The present disclosure has been made in view of such circumstances, and can prevent a reduction in image quality of a two-dimensional display image based on 3D data.

Solution to Problem

According to one aspect of the present technology, there is provided an image processing apparatus including a geometry data generating unit configured to generate geometry data that is a frame image having arranged thereon a projected image obtained by projecting 3D data representing a three-dimensional structure on a two-dimensional plane and includes a special value indicating occupancy map information in a range, and an encoding unit configured to encode the geometry data generated by the geometry data generating unit.

According to one aspect of the present technology, there is provided an image processing method including generating geometry data that is a frame image having arranged thereon a projected image obtained by projecting 3D data representing a three-dimensional structure on a two-dimensional plane and includes a special value indicating occupancy map information in a range, and encoding the geometry data generated.

According to another aspect of the present technology, there is provided an image processing apparatus including a decoding unit configured to decode encoded data on geometry data that is a frame image having arranged thereon a projected image obtained by projecting 3D data representing a three-dimensional structure on a two-dimensional plane and includes a special value indicating occupancy map information in a range, and an extraction unit configured to extract, from the geometry data generated by the decoding unit from the encoded data, a depth value indicating a position of the 3D data, and the occupancy map information.

According to another aspect of the present technology, there is provided an image processing method including decoding encoded data on geometry data that is a frame image having arranged thereon a projected image obtained by projecting 3D data representing a three-dimensional structure on a two-dimensional plane and includes a special value indicating occupancy map information in a range, and extracting, from the geometry data generated from the encoded data, a depth value indicating a position of the 3D data and the occupancy map information.

In image processing apparatus and method according to one aspect of the present technology, geometry data that is a frame image having arranged thereon a projected image obtained by projecting 3D data representing a three-dimensional structure on a two-dimensional plane and includes a special value indicating occupancy map information in a range is generated, and the geometry data generated is encoded.

In image processing apparatus and method according to another aspect of the present technology, encoded data on geometry data that is a frame image having arranged thereon a projected image obtained by projecting 3D data representing a three-dimensional structure on a two-dimensional plane and includes a special value indicating occupancy map information in a range is decoded, and, from the geometry data generated from the encoded data, a depth value indicating a position of the 3D data and the occupancy map information are extracted.

BRIEF DESCRIPTION OF DRAWINGS

FIG. 1 is a diagram illustrating an example of a point cloud encoding method.

FIG. 3 is a diagram illustrating an example of syntax.

FIG. 5 is a diagram illustrating examples of syntax.

FIG. 6 is a diagram illustrating examples of parameters that are signaled.

FIG. 8 is a diagram illustrating examples of syntax.

FIG. 10 is a diagram illustrating examples of syntax.

FIG. 12 is a diagram illustrating examples of syntax.

DESCRIPTION OF EMBODIMENTS

Figure 2:
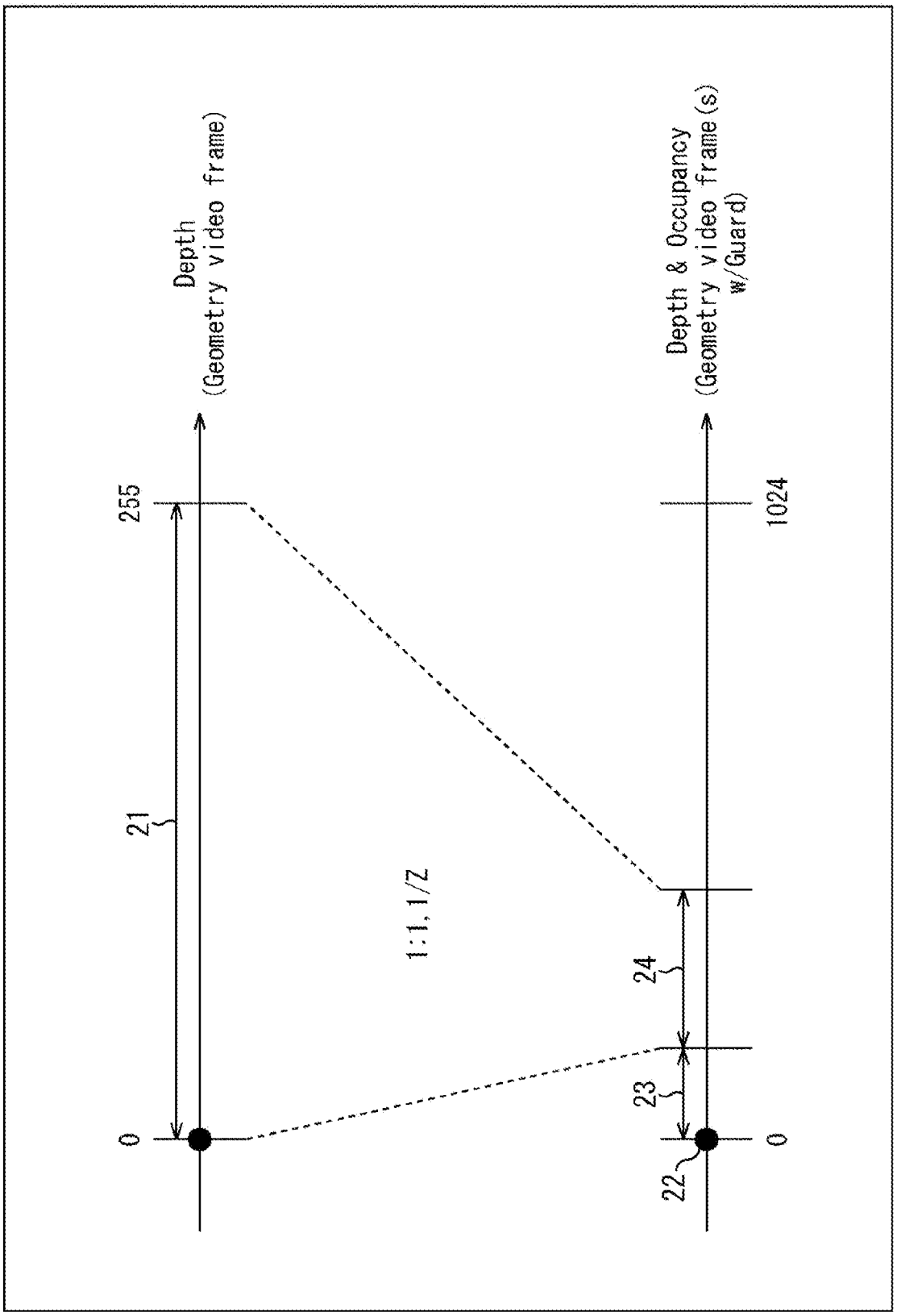
FIG. 2 is a diagram illustrating an example of how a special value is embedded in a range of geometry data.

Now, modes for carrying out the present disclosure (hereinafter referred to as "embodiments") are described. Note that the following items are described in order.
1. High Resolution Occupancy Map
2. First Embodiment (Encoding Apparatus)
3. Second Embodiment (Decoding Apparatus)
4. Locally High Resolution Occupancy Map
5. Third Embodiment (Encoding Apparatus)
6. Fourth Embodiment (Decoding Apparatus)
7. Note 1. High Resolution Occupancy Map <Documents Etc. That Support Technical Contents and Technical Terms>

The scope disclosed in the present technology includes not only the contents described in the embodiments, but also the contents described in the following pieces of Non Patent Literature well known at the time of the filing of the subject application.
NPL 1: (described above)
NPL 2: TELECOMMUNICATION STANDARDIZATION SECTOR OF ITU (International Telecommunication Union), "Advanced video coding for generic audiovisual services," H. 264, April 2017
NPL 3: TELECOMMUNICATION STANDARDIZATION SECTOR OF ITU (International Telecommunication Union), "High efficiency video coding," H. 265, December 2016
NPL 4: Jianle Chen, Elena Alshina, Gary J. Sullivan, Jens-Rainer, Jill Boyce, "Algorithm Description of Joint Exploration Test Model 4," JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017

That is, also the contents described in the pieces of Non Patent Literature described above serve as the bases for determining the support requirements. For example, even in a case where the quad-tree block structure described in NPL 3 and the QTBT (Quad Tree Plus Binary Tree) block structure described in NPL 4 are not directly described in the embodiments, such structures are within the scope of the disclosure of the present technology and satisfy the support requirements of the scope of the claims. Further, in a similar manner, even in a case where technical terms, for example, parsing, syntax, and semantics are not directly described in the embodiments, such technical terms are within the scope of the disclosure of the present technology and satisfy the support requirements of the scope of the claims.

<Point Cloud>

Hitherto, there has been data representing three-dimensional structures with, for example, position information and attribute information regarding point groups, such as point clouds. Point clouds have relatively simple data structures. With the use of a point cloud having a sufficiently large number of points, any three-dimensional structure can be expressed with sufficient accuracy.

<Outline of Video-Based Approach>

There has been proposed a video-based approach that projects position information and attribute information regarding such a point cloud on a two-dimensional plane in units of subregions, arranges images (patches) projected on the two-dimensional plane on frame images, and encodes the frame images by a two-dimensional image encoding method.

In the video-based approach, an input point cloud is divided into a plurality of segmentations (also referred to as "regions"), and the points are projected on a two-dimensional plane in units of the segmentations. Since the point cloud includes position information (Geometry) and attribute information (Texture) regarding each point, the points are projected on the two-dimensional plane in terms of the position information and the attribute information.

Then, the segmentations projected on the two-dimensional plane (also referred to as "patches") are arranged on frame images (two-dimensional images). That is, a frame image having arranged thereon the patches of the position information (also referred to as a "geometry video frame"), and a frame image having arranged thereon the patches of the attribute information (also referred to as a "color video frame") are generated.

Note that, in the geometry video frame, the position information regarding the points is expressed as position information in the depth direction (depth value (Depth)). That is, each pixel value of the frame image indicates the depth value.

These frame images are encoded by a two-dimensional plane image encoding method, for example, AVC (Advanced Video Coding) or HEVC (High Efficiency Video Coding).

<Occupancy Map>

In the case of such a video-based approach, occupancy maps can also be used. An occupancy map is map information indicating the presence or absence of projected images (patches) in units of N×N pixels of a geometry video frame. For example, an occupancy map indicates a region (N×N pixels) of a geometry video frame in which patches are present by a value "1," and indicates a region (N×N pixels) in which no patch is present by a value "0."

Such an occupancy map is encoded as data different from a geometry video frame and a color video frame to be transmitted to a decoding side. The decoder can grasp, by referring to the occupancy map, whether or not patches are present in a region to reduce, for example, the effect of noise generated due to encoding or decoding, to thereby recover 3D data more accurately. For example, even when depth values have been changed due to encoding or decoding, the decoder can ignore, by referring to an occupancy map, the depth values of regions in which no patch is present (does not process the depth values as position information regarding 3D data).

However, in order to prevent an increase in code amount, occupancy maps, which are not directly displayed as images (are auxiliary information), have generally been generated as information at a resolution (in units of N×N pixels) lower than the resolution of geometry video frames (in units of 1×1 pixels) as described above. Thus, there is a fear that, due to the low resolution of an occupancy map, the quality of recovered 3D data is reduced, and the image quality of a display image obtained by projecting the 3D data on a two-dimensional plane is thus reduced.

<Synthesis of Occupancy Map and Geometry Data>

Thus, occupancy maps are embedded in geometry video frames. In other words, occupancy maps and geometry video frames are synthesized.

That is, as illustrated in the uppermost row of Table 10 of FIG. 1, geometry data including, in the range of the pixel values of a geometry video frame (also referred to as the geometry data), a special value indicating occupancy map information is generated. That is, geometry data that is the special value indicates occupancy map information, and geometry data that is a value other than the special value indicates depth values.

Accordingly, geometry data can indicate both depth values and occupancy map information. Thus, the need of transmitting an occupancy map in addition to a geometry video frame and a color video frame is eliminated, with the result that a reduction in encoding efficiency can be prevented (typically, the encoding efficiency can be enhanced).

<Occupancy Map Information>

Occupancy map information is information indicated by an occupancy map, that is, information indicating the presence or absence of patches. For example, the special value may indicate that no patch is present at a position of a geometry video frame. In other words, geometry data that is the special value may indicate that no patch is present in the pixel (occupancy map=0), and geometry data that is a value other than the special value may indicate the depth values of patches (occupancy map=1).

Accordingly, the presence or absence of patches can be expressed in units of pixels. That is, a higher resolution occupancy map (for example, in units of 1×1 pixels) can be transmitted to the decoding side. That is, the decoder can perform decoding using the higher resolution occupancy map. In other words, the decoder can grasp the presence or absence of patches at the higher resolution (in units of smaller regions). Thus, for example, a reduction in image quality of a display image obtained by projecting recovered 3D data on a two-dimensional plane can be prevented (typically, the image quality can be enhanced).

That is, while a reduction in encoding efficiency can be prevented, a reduction in image quality of a display image obtained by projecting recovered 3D data on a two-dimensional plane can be prevented.

<Setting of Special Value>

Note that the special value may be set in advance or set by an encoder, for example, as illustrated in the left part of the second to sixth rows from the top of Table 10 of FIG. 1.

For example, the upper arrow of FIG. 2 indicates an example of the range of geometry data in a case where the geometry data only indicates depth values. In this case, as indicated by a double-sided arrow 21, a range of from 0 to 255 is set as a range indicating depth values (Depth). Further, the lower arrow of FIG. 2 indicates an example of the range of geometry data in a case where the geometry data includes the special value. In this case, a range indicated by a double-sided arrow 24 is set as a range indicating depth values (Depth). Further, a special value 22 is set to a value of 0 outside the range indicated by the double-sided arrow 24.

The special value can be set as described above, so that the encoder can set the special value on the basis of the geometry data (the range indicating depth values (Depth) thereof (the range indicated by the double-sided arrow 24)). The range indicating depth values depends on 3D data, and is not constant. However, the special value can be set as described above, so that the encoder can set the special value 22 to a value outside the range indicated by the double-sided arrow 24 as in FIG. 2, for example. Thus, the encoder can set the special value identifiable from depth values.

For example, as illustrated in syntax 31 of FIG. 3, in a case where no patch is present (!occupied), geometry data is set to the special value (Depth=special value). Note that, in the syntax 31, the geometry data is described as "Depth." This is because geometry data indicates only depth values in the related art.

A position at which the special value is set (a position in the range) is set as desired. For example, the special value may be the minimum value (min) of geometry data (the second row from the top of Table 10 of FIG. 1), the maximum value (max) of geometry data (the third row from the top of Table 10 of FIG. 1), or a value other than the minimum value and the maximum value (intermediate value (middle)) (the fourth row from the top of Table 10 of FIG. 1). Further, a single or a plurality of special values may be set (the sixth row from the top of Table 10 of FIG. 1). That is, at least one of the minimum value, maximum value, or intermediate value of the range of geometry data may be set as the special value.

<Guard Margin>

Further, as in the example of FIG. 2, a margin indicated by a double-sided arrow 23 (also referred to as a "guard margin") may be provided between the special value 22 and the range indicated by the double-sided arrow 24 (the range indicating depth values (Depth)).

The value of geometry data may be changed due to encoding or decoding. Thus, for example, a case in which, when the special value 22 is adjacent to the range indicated by the double-sided arrow 24, geometry data that has been a depth value before encoding is changed to the special value 22 as a result of decoding, is conceivable. Thus, the guard margin is provided to the range of geometry data, so that the effect of noise due to encoding or decoding can be reduced, and the special value can thus be more clearly separated from depth values.

The guard margin may be set in advance or set by the encoder, for example, as illustrated in the left part of the seventh row from the top of Table 10 of FIG. 1. That is, a margin having a predetermined width may be set between the range indicating depth values indicating the position of 3D data and the special value in the range of geometry data.

The guard margin (the range indicated by the double-sided arrow 23) can be set as described above, so that the encoder can set the special value 22 and the guard margin on the basis of the geometry data (the range indicating depth values (Depth) thereof (the range indicated by the double-sided arrow 24)). The range indicating depth values depends on 3D data and is not constant. However, the guard margin can be set as described above, so that the encoder can set the guard margin and the special value 22 outside the range indicated by the double-sided arrow 24 as in FIG. 2, for example. Thus, the encoder can set a special value that is more clearly identifiable from depth values.

Note that the size (width) of the guard margin is set as desired. With a guard margin having a larger width, a distance between the special value 22 and the range indicating depth values is larger, so that the special value 22 can be more clearly identified from depth values (the immunity against noise due to encoding or decoding can be enhanced). However, with a guard margin having a larger width, a wider range needs to be secured as the range of geometry data.

For example, as illustrated in the right part of the seventh row from the top of Table 10 of FIG. 1, the width of the guard margin may be set on the basis of the target rate (QP) of encoding or the like. Accordingly, a guard margin having a width based on geometry data can be set.

<Threshold>

As described above, the value of geometry data may be changed due to encoding or decoding. Thus, a case in which, in a decoding result, geometry data is positioned in the guard margin, that is, a range that is neither the range indicating depth values nor the special value, is conceivable. In such a case, whether the geometry data is the depth value or the special value needs to be identified.

Figure 4:
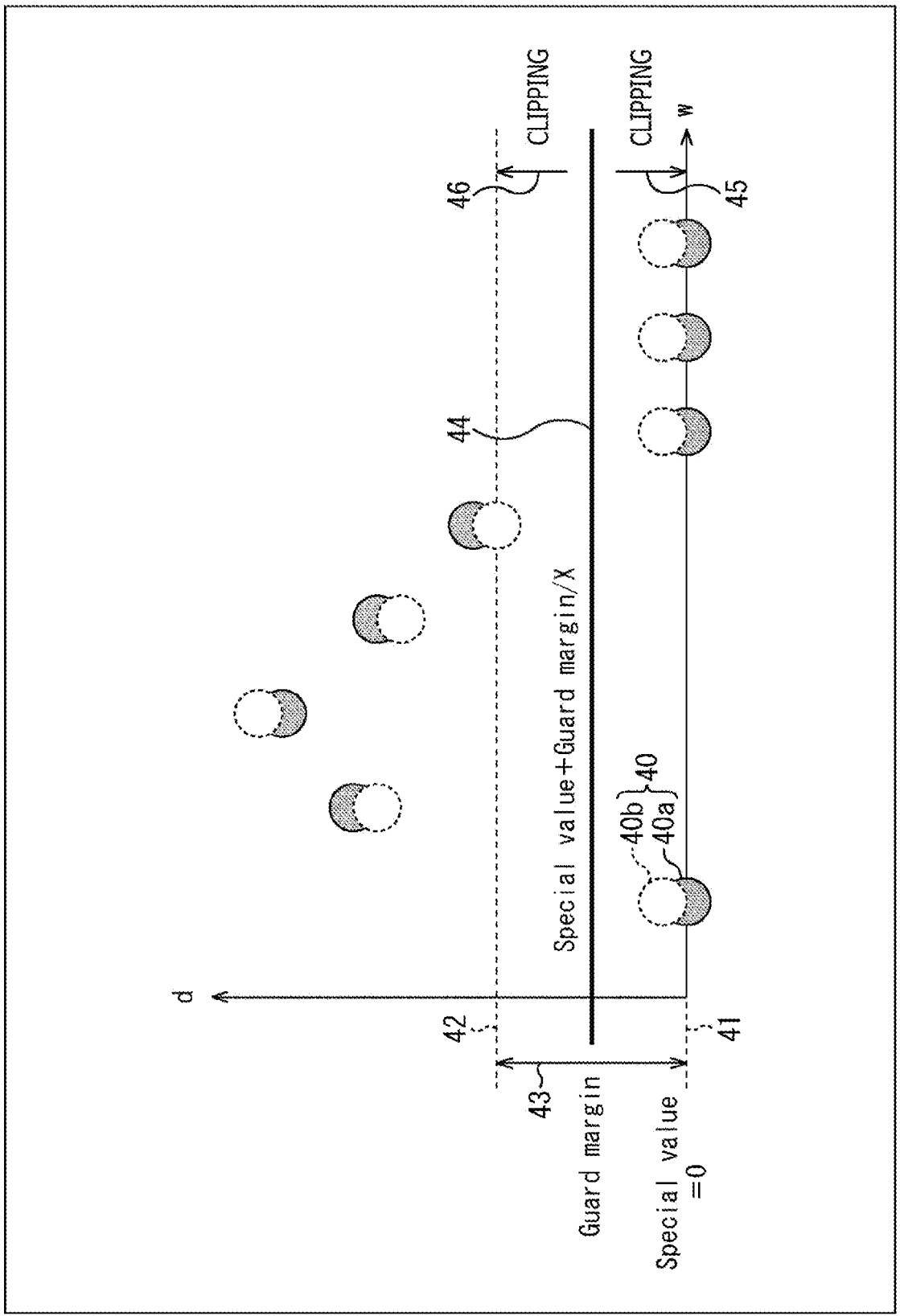
FIG. 4 is a diagram illustrating an example of how relevant parameters are set.

For example, in the case of FIG. 4, a special value of 0 (special value=0) is set, and a range between the special value (dotted line 41) and the minimum value of a range indicating depth values (dotted line 42) (a range indicated by a double-sided arrow 43) is set as the guard margin. Further, in FIG. 4, geometry data 40a indicated by the gray solid circles represents geometry data before encoding, and geometry data 40b indicated by the white dotted circles represents geometry data after decoding. Note that, in a case where there is no need to distinguish the geometry data 40a and the geometry data 40b from each other in description, the geometry data 40a and the geometry data 40b are referred to as "geometry data 40."

In FIG. 4, although the symbol is added to each of the single geometry data 40a, the single geometry data 40b, and the geometry data 40, all the gray solid circles illustrated in FIG. 4 indicate the geometry data 40a before encoding at the respective positions. In a similar manner, all the white dotted circles illustrated in FIG. 4 indicate the geometry data 40b after decoding at the respective positions. Further, all the gray solid circles and white dotted circles illustrated in FIG. 4 indicate the geometry data 40 at the respective positions.

For example, in a case where the geometry data 40b after decoding is positioned in the guard margin indicated by the double-sided arrow 43, the geometry data 40b may be clipped to the special value (dotted line 41) or the minimum value of the range indicating depth values (dotted line 42). For example, in a case where the geometry data 40b is smaller than a boundary 44 indicated by the solid line in FIG. 4, the geometry data 40b may be clipped to the special value (dotted line 41) (arrow 45).

Further, for example, in a case where it is determined that the geometry data 40b is equal to or larger than the boundary 44, the geometry data 40b may be clipped to the minimum value of the range indicating depth values (dotted line 42) (arrow 46).

For example, in a case where a value d of the geometry data 40b is smaller than the boundary 44, the encoder clips the geometry data 40b to the special value (occupancy map=0) as in syntax 51 of FIG. 5. Further, in a case where the geometry data 40b in the guard margin is equal to or larger than the boundary 44, the encoder clips the geometry data 40b not to the special value (occupancy map=1), but to the upper limit of the guard margin (d=max (d, guard margin)) as in syntax 52.

Geometry data is clipped as described above, so that the special value 22 can be more clearly identified from depth values (the immunity against noise due to encoding or decoding can be enhanced).

Note that the position (value) of the boundary 44 is determined as desired as long as being in the guard margin. For example, the encoder may set the position of the boundary 44. For example, the encoder may set a threshold X that is a parameter associated with the boundary 44.

For example, as illustrated in FIG. 4, the boundary 44 may be derived as (Special value+Guard margin/X) using the special value (Special value), the width of the guard margin (Guard margin), and the threshold X. That is, the threshold X for identifying depth values indicating the position of 3D data and the special value may be set. Accordingly, the boundary 44 can be set. That is, the boundary 44 can be variable.

Note that the threshold X is set by any setting method. For example, the threshold X may be set on the basis of geometry data generated by decoding encoded data on the geometry data. That is, as illustrated in the right part of the eighth row from the top of Table 10 of FIG. 1, an occupancy map in the local decoding of geometry data may be evaluated, and the threshold X may be set on the basis of the evaluation result. Accordingly, the threshold X based on the geometry data can be set. That is, the boundary 44 based on the geometry data can be set.

<Correction of Depth Value>

Note that, when the special value is set to the range of geometry data, depth values (a range indicating the depth values) may be corrected as illustrated in the left part of the ninth and tenth rows from the top of Table 10 of FIG. 1.

For example, there is a case where, as illustrated in the upper part of FIG. 2, a range indicating depth values is the same as or approximates to the range of geometry data so that a space (range) in which the special value and the guard margin are set is not secured. Thus, in such a case, depth values may be corrected so that the range indicating the depth values may be changed. Accordingly, a range in which the special value and the guard margin can be set can be provided to the range of the geometry data. That is, the range indicating depth values indicating the position of 3D data may be corrected to generate geometry data including the special value in the range.

Note that depth values are corrected in a manner as desired. For example, depth values may be quantized as illustrated in the right part of the ninth row from the top of Table 10 of FIG. 1, or depth values may be shifted in the positive or negative direction as illustrated in the right part of the tenth row from the top of Table 10 of FIG. 1. The correction amount of depth values is also set as desired. For example, a predetermined correction amount may be set in advance, or a correction amount may be set on the basis of geometry data.

<Signaling of Parameter>

Further, as illustrated in the left part of the eleventh to sixth rows from the top of Table 10 of FIG. 1, special value-related parameters may be transmitted (signaled) to the decoding side. For example, a bitstream including encoded data on geometry data may include the special value-related parameters. Accordingly, the decoder can more easily grasp settings (special value-related parameters) used in encoding. Thus, the decoder can more appropriately decode encoded data on geometry data having the special value and the like set in the range.

Note that the special value-related parameters may be any parameter. For example, as illustrated in the right part of the eleventh to thirteenth rows from the top of Table 10 of FIG. 1, the parameters may include at least one of information indicating the above-mentioned special value, information indicating the guard margin, or information indicating the threshold.

Further, the information indicating the special value may be information directly indicating the special value or information indirectly indicating the special value. Further, the information indicating the guard margin may be information directly indicating the guard margin or information indirectly indicating the guard margin. Further, the information indicating the threshold may be information directly indicating the threshold or information indirectly indicating the threshold. Examples of the special value-related parameters that are signaled are described in syntax 61 of FIG. 6. In the case of the syntax 61, information indicating the special value by an index (Special value index), information indicating the guard margin width (Guard margin value), and the threshold X (Threshold X) are signaled as the special value-related parameters.

Further, of the special value-related parameters is signaled at any frequency. For example, the special value-related parameters may be signaled in units of patches, frames, or sequences (the special value-related parameters may be included in a bitstream in units of patches, frames, or sequences). Further, for example, the special value-related parameters may be signaled in units of data in a plurality of levels, such as patches and frames or frames and sequences. Note that the encoder or the like may set the frequency. Further, the frequency may be changed depending on geometry data, processing statuses, or the like.

<Extraction of Occupancy Map and Geometry Data>

Further, on the decoding side, an occupancy map and geometry data are extracted from geometry data including the special value indicating occupancy map information in the range as described above. In other words, the occupancy map is separated from the geometry data (geometry video frame).

That is, as illustrated in the seventeenth row from the top of Table 10 of FIG. 1, from geometry data including the special value indicating occupancy map information in the range of the pixel values of a geometry video frame (also referred to as the geometry data), an occupancy map and geometry data only including a depth value are extracted. For example, encoded data on geometry data that is a frame image having arranged thereon a projected image obtained by projecting 3D data representing a three-dimensional structure on a two-dimensional plane, and includes a special value indicating occupancy map information in the range is decoded, and a depth value indicating the position of the 3D data and the occupancy map information are extracted from geometry data generated from the encoded data.

Accordingly, the decoder can obtain both depth values and occupancy map information from decoded geometry data. Thus, the decoder can prevent a reduction in encoding efficiency (typically, can enhance the encoding efficiency). Further, the decoder can recover 3D data using a higher resolution occupancy map, so that the decoder can grasp the presence or absence of patches at a higher resolution (in units of smaller regions). Thus, for example, a reduction in image quality of a display image obtained by projecting recovered 3D data on a two-dimensional plane can be prevented (typically, the image quality can be enhanced).

That is, while a reduction in encoding efficiency can be prevented, a reduction in image quality of a display image obtained by projecting recovered 3D data on a two-dimensional plane can be prevented.

<Parameter>

Here, the decoder may extract, for example, as illustrated in the left part of the eighteenth to twentieth rows from the top of Table 10 of FIG. 1, a depth value and the special value from decoded geometry data on the basis of the special value-related parameters. Further, the special value-related parameters may be signaled from the encoder. For example, a bitstream including encoded data on geometry data may include the special value-related parameters. Accordingly, the decoder can more easily grasp settings (special value-related parameters) used in encoding. Thus, the decoder can more appropriately decode encoded data on geometry data having the special value and the like set in the range.

Note that, as described above, the special value-related parameters may be any parameter. For example, as illustrated in the right part of the eighteenth to twenties rows from the top of Table 10 of FIG. 1, the parameters may include at least one of information indicating the above-mentioned special value, information indicating the guard margin, or information indicating the threshold.

Figure 7:
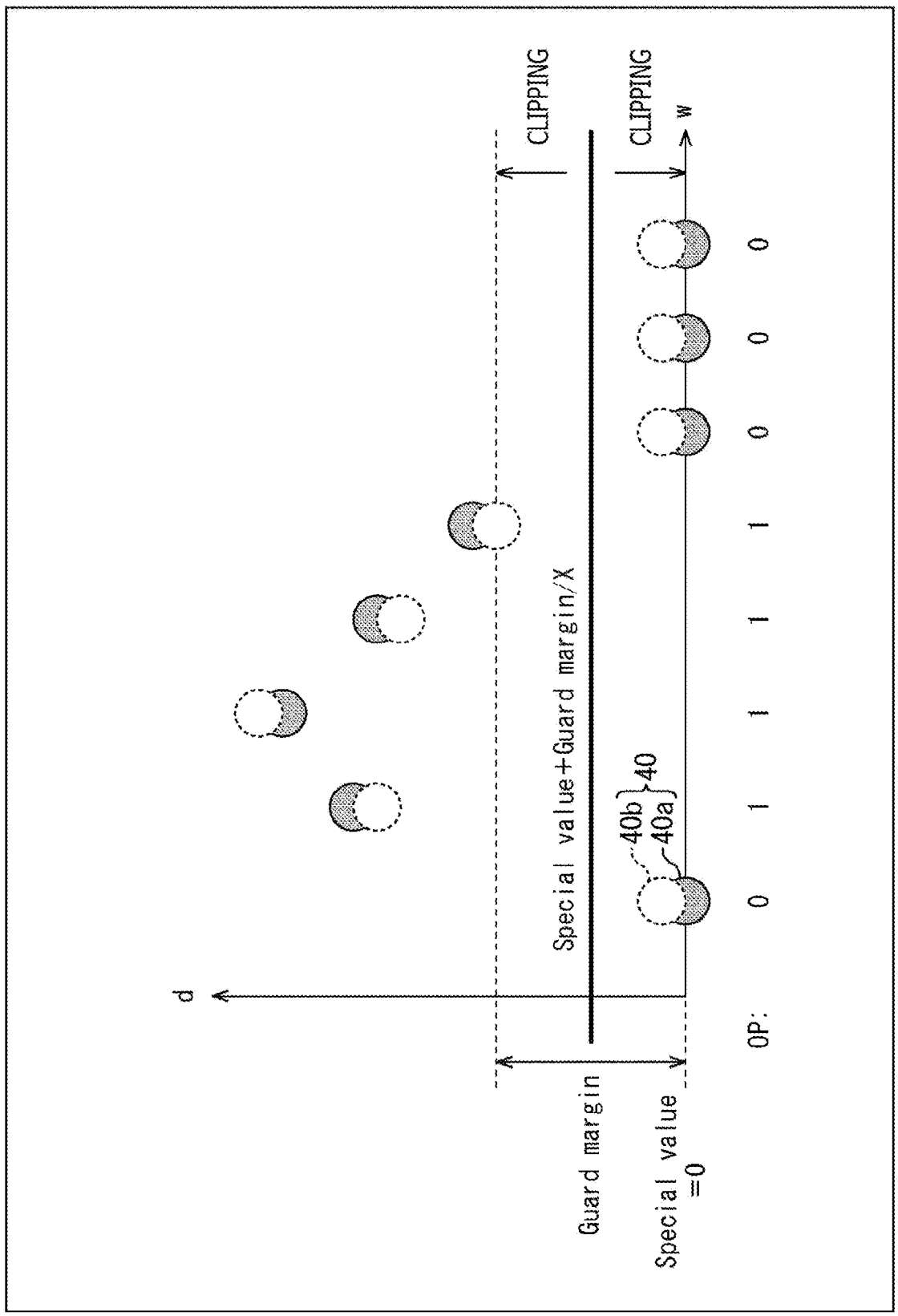
FIG. 7 is a diagram illustrating an example of how occupancy map information is extracted.

For example, as in FIG. 7, a boundary may be obtained from the special value (Special value), the guard margin (Guard margin), and the threshold X (Special value+Guard margin/X), an occupancy map for each pixel is generated with the boundary as in the syntax 51 and the syntax 52 of FIG. 5, and then the geometry data 40*b* after decoding may be clipped.

Further, the geometry data 40*b* may be clipped to both the ends of the guard margin as in syntax 81 of FIG. 8, and then an occupancy map may be generated as in syntax 82.

<Inverse Correction of Depth Value>

Further, in a case where depth values (a range indicating the depth values) have been corrected when the special value is set to the range of geometry data, the depth value may be inversely corrected when an occupancy map and geometry data are extracted from the geometry data as illustrated in the left part of the twenty-first and twenty-second rows from the top of Table 10 of FIG. 1. That is, to undo a correction performed in encoding, the decoder may perform processing reverse to the correction processing (inverse correction) on the extracted depth value (the range thereof). Accordingly, the geometry data having a more accurate value can be extracted.

Note that depth values are corrected in a manner as desired. For example, depth values may be inversely quantized as illustrated in the right part of the twenty-first row from the top of Table 10 of FIG. 1, or depth values may be shifted in a direction reverse to a shift direction in encoding as illustrated in the right part of the twenty-second row from the top of Table 10 of FIG. 1. The correction amount of depth values is also set as desired. For example, a predetermined correction amount may be set in advance, or a correction amount may be set on the basis of geometry data.

<Example in which Special Value is Maximum Value>

Note that, in the above, the case where the special value is 0, that is, the minimum value of the range of geometry data is mainly exemplified, but the special value can be set to any value as described above. For example, as illustrated in FIG. 9, the maximum value of the range of geometry data may be used as the special value (Special value=max).

In this case, a range indicating depth values is present below the special value (dotted line 91). Thus, a guard margin (Guard margin) is set below the special value, more specifically, in a range between the special value (dotted line 91) and the maximum value of the range indicating depth values (dotted line 92) (a range indicated by a double-sided arrow 93).

Figure 9:
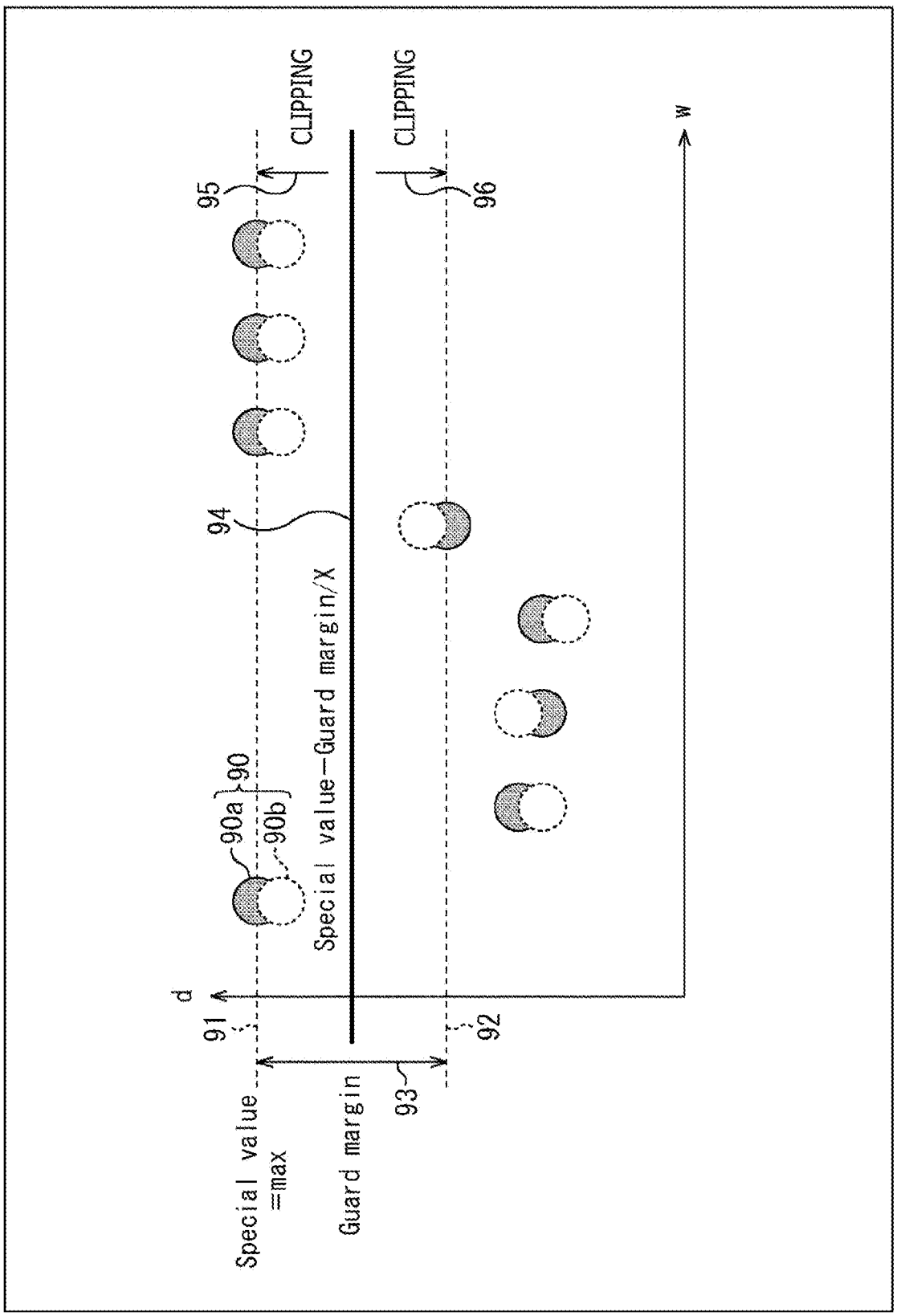
FIG. 9 is a diagram illustrating another example of how the relevant parameters are set.

Note that, in FIG. 9, geometry data 90a indicated by the gray solid circles represents geometry data before encoding, and geometry data 90b indicated by the white dotted circles represents geometry data after decoding. In a case where there is no need to distinguish the geometry data 90a and the geometry data 90b from each other in description, the geometry data 90a and the geometry data 90b are referred to as "geometry data 90."

Since the guard margin is present below the special value as described above, in this case, a boundary 94 is derived as (Special value−Guard margin/X). The geometry data 90b having a value equal to or larger than the boundary 94 is clipped to the special value (dotted line 91) (arrow 95). Further, the geometry data 90b having a value smaller than the boundary 94 and equal to or larger than the maximum value of the range indicating depth values (dotted line 92) is clipped to the maximum value of the range indicating depth values (dotted line 92) (arrow 96). That is, as in syntax 101 and syntax 102 of FIG. 10, occupancy map generation and geometry data clipping are performed.

<Example in which Special Value is Median>

Figure 11:
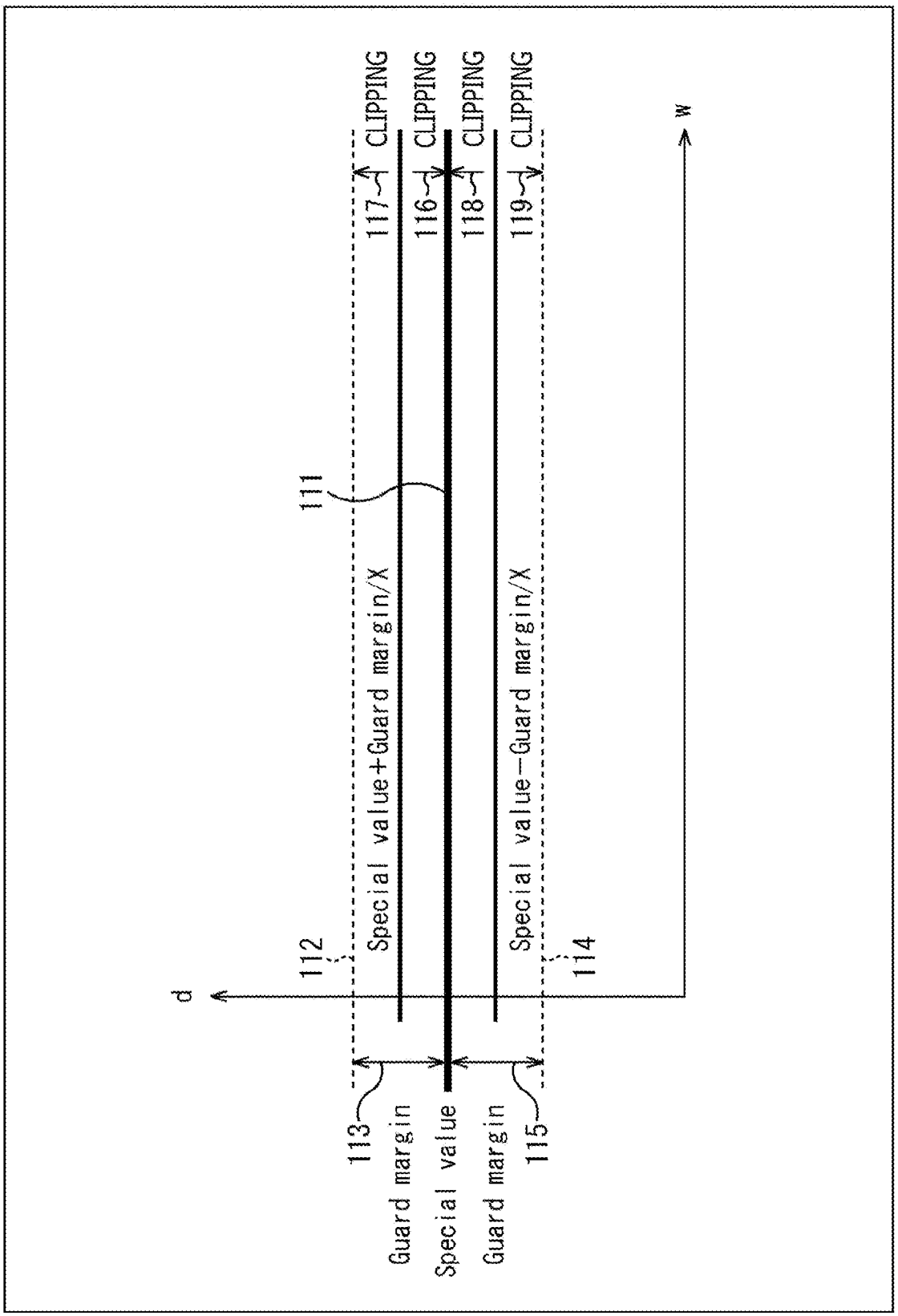
FIG. 11 is a diagram illustrating another example of how the relevant parameters are set.

Further, for example, as illustrated in FIG. 11, the median of the range of geometry data (a value other than the minimum value and the maximum value) may be used as the special value (Special value=middle).

In this case, ranges indicating depth values are present above and below the special value (thick line 111). Thus, guard margins (Guard margin) are set above and below the special value. More specifically, the guard margin is set in a range between the special value (thick line 111) and the minimum value of the range indicating depth values above the special value (dotted line 112) (a range indicated by a double-sided arrow 113). Further, the guard margin is also set in a range between the special value (thick line 111) and the maximum value of the range indicating depth values below the special value (dotted line 114) (a range indicated by a double-sided arrow 115).

That is, in this case, the plurality of guard margins is set. Thus, a plurality of boundaries is also set. For example, the boundary of the guard margin indicated by the double-sided arrow 113 is derived as (Special value+Guard margin/X). Geometry data included in the range from the special value (thick line 111) to this boundary is clipped to the special value (thick line 111) (arrow 116). Further, geometry data included in the range from this boundary to the minimum value of the range indicating depth values above the special value (thick line 111) (dotted line 112) is clipped to the minimum value of the range indicating depth values (dotted line 112) (arrow 117).

Further, for example, the boundary of the guard margin indicated by the double-sided arrow 115 is derived as (Special value−Guard margin/X). Geometry data included in the range from this boundary to the special value (thick line 111) is clipped to the special value (thick line 111) (arrow 118). Further, geometry data included in the range from the maximum value of the range indicating depth values below the special value (thick line 111) (dotted line 114) to this boundary is clipped to the maximum value of the range indicating depth values (dotted line 114) (arrow 119). That is, as in syntax 121 and syntax 122 of FIG. 12, occupancy map generation and geometry data clipping are performed.

<Selection>

Note that the encoder may select the special value from the above-mentioned three (the minimum value, the maximum value, and the intermediate value of the range of geometry data). For example, the encoder may select the position of the special value from the candidates on the basis of geometry data (the distribution of depth values). Accordingly, the need of depth value correction is further reduced, so that a reduction in encoding efficiency can be prevented. Further, the encoder may select the position of the special value in any data unit. For example, the encoder may search for an empty range (a range not to be used for depth values) on the basis of the distribution of the depth values, and set the special value in the found empty range. Accordingly, the need of depth value correction is further reduced so that a reduction in encoding efficiency can be prevented.

<Combination>

Note that a single or a plurality of special values may be set. For example, a combination of the above-mentioned three special values (the minimum value, the maximum value, and the intermediate value of the range of geometry data) may be used. For example, the special value may be set to each minimum value and maximum value of the range of geometry data.

2. First Embodiment

<Encoding Apparatus>

Figure 13:
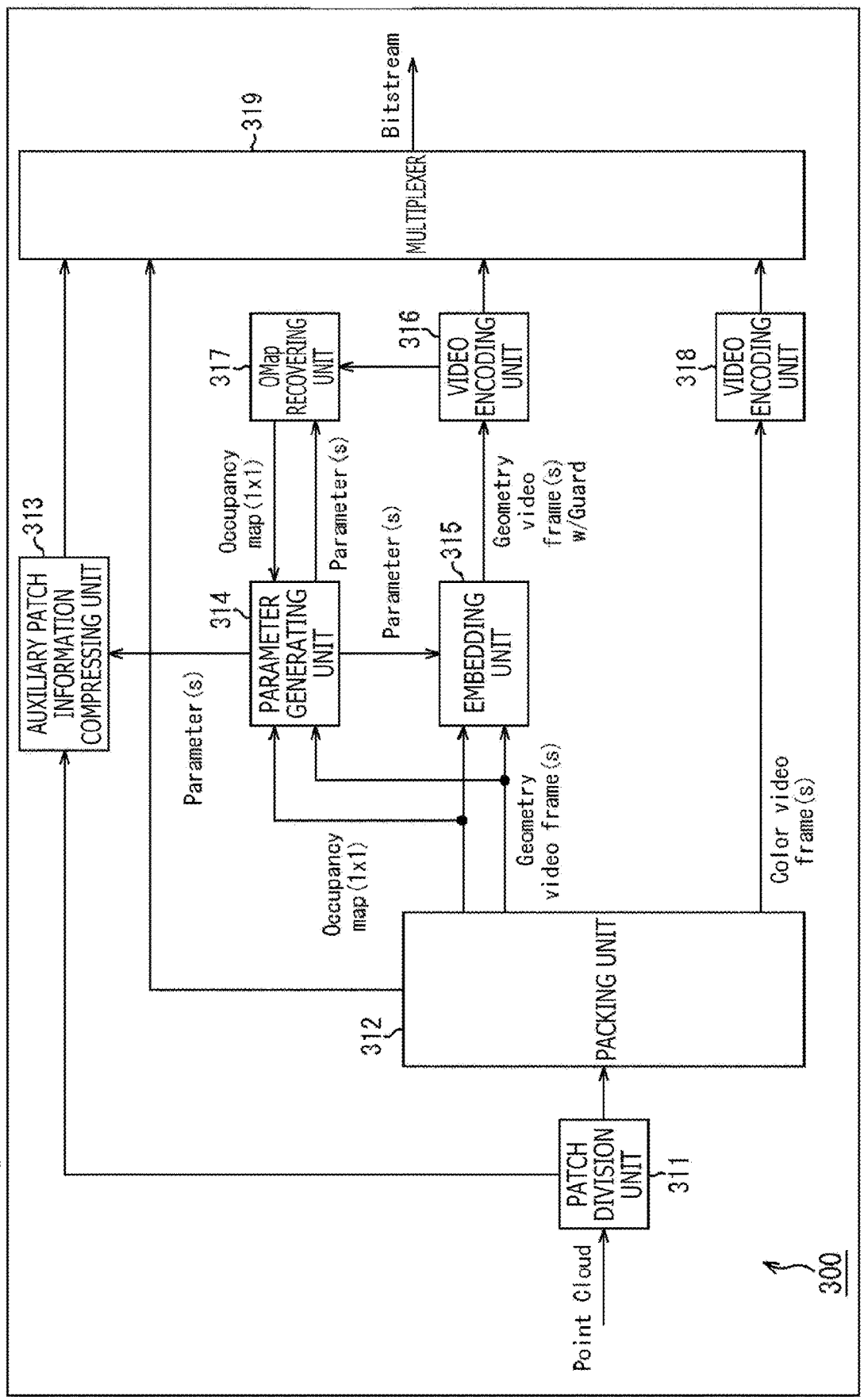
FIG. 13 is a block diagram illustrating an example of a main configuration of an encoding apparatus.

FIG. 13 is a block diagram illustrating an example of a configuration of an encoding apparatus that is an aspect of an image processing apparatus to which the present technology has been applied. An encoding apparatus 300 illustrated in FIG. 13 is an apparatus configured to project 3D data such as a point cloud on a two-dimensional plane to encode the 3D data by a two-dimensional image encoding method (an encoding apparatus employing the video-based approach). Further, as described above in <1. High Resolution Occupancy Map>, the encoding apparatus 300 generates geometry data including a special value indicating occupancy map information in the range, encodes the geometry data, and transmits the encoded geometry data to the decoding side.

Note that FIG. 13 illustrates the processing units, the flow of data, and like, which are principal, and FIG. 13 does not necessarily illustrate everything. That is, in the encoding apparatus 300, there may be processing units that are not illustrated as blocks in FIG. 13, or there may be processing or the flow of data that are not illustrated as arrows or the like in FIG. 13. The same holds true for other figures illustrating the processing units or the like in the encoding apparatus 300.

As illustrated in FIG. 13, the encoding apparatus 300 includes a patch division unit 311, a packing unit 312, an auxiliary patch information compressing unit 313, a parameter generating unit 314, an embedding unit 315, a video encoding unit 316, an OMap recovering unit 317, a video encoding unit 318, and a multiplexer 319.

The patch division unit 311 performs processing related to the division of 3D data. For example, the patch division unit 311 acquires 3D data (for example, point cloud) representing a three-dimensional structure, which is input to the encoding apparatus 300. Further, the patch division unit 311 divides the acquired 3D data into a plurality of segmentations, and projects the 3D data on a two-dimensional plane in units of the segmentations, to thereby generate the patches of position information and the patches of attribute information.

The patch division unit 311 supplies information associated with the generated patches to the packing unit 312. Further, the patch division unit 311 supplies, to the auxiliary patch information compressing unit 313, auxiliary patch information that is information associated with the division.

The packing unit 312 performs processing related to the packing of data. For example, the packing unit 312 acquires data (patches) on a two-dimensional plane on which 3D data has been projected in units of regions, the data being supplied from the patch division unit 311. Further, the packing unit 312 arranges the acquired patches on two-dimensional images to pack the patches as video frames. For example, the packing unit 312 packs, as video frames, the patches of position information (Geometry) indicating the positions of points and the patches of attribute information (Texture) added to the position information, such as color information. Further, the packing unit 312 generates a high resolution occupancy map indicating the presence or absence of position information (patches) in units of 1×1 pixels.

That is, the packing unit 312 generates the geometry video frame (Geometry video frame(s)), the color video frame (Color video frame(s)), and the high resolution occupancy map (Occupancy map (1×1)).

The packing unit 312 supplies the generated geometry video frame and the high resolution occupancy map to the parameter generating unit 314 and the embedding unit 315. Further, the packing unit 312 supplies the color video frame to the video encoding unit 318. Moreover, the packing unit 312 supplies control information associated with the packing to the multiplexer 319.

The auxiliary patch information compressing unit 313 performs processing related to the compression of auxiliary patch information. For example, the auxiliary patch information compressing unit 313 acquires data supplied from the patch division unit 311. Further, the auxiliary patch information compressing unit 313 acquires special value-related parameters (Parameter(s)) supplied from the parameter generating unit 314. The auxiliary patch information compressing unit 313 encodes (compresses) these pieces of acquired data as auxiliary patch information. The auxiliary patch information compressing unit 313 supplies the thus generated encoded data on the auxiliary patch information to the multiplexer 319.

The parameter generating unit 314 performs processing related to the generation of special value-related parameters. For example, the parameter generating unit 314 acquires a geometry video frame (Geometry video frame(s)) and a high resolution occupancy map (Occupancy map (1×1)) supplied from the packing unit 312. Further, the parameter generating unit 314 acquires a recovered high resolution occupancy map (Occupancy map (1×1)) supplied from the OMap recovering unit 317. Moreover, the parameter generating unit 314 acquires any information such as the target rate (QP) of encoding.

The parameter generating unit 314 generates special value-related parameters on the basis of those pieces of information. For example, the parameter generating unit 314 generates parameters such as a special value, a guard margin, and a threshold. The parameter generating unit 314 supplies the generated (set) parameters to the embedding unit 315 or the OMap recovering unit 317 as needed. Further, when the values of the parameters are ultimately determined, the parameter generating unit 314 supplies the parameters having the determined values to the auxiliary patch information compressing unit 313.

The embedding unit 315 performs processing related to the embedding of occupancy maps in geometry data. In other words, the embedding unit 315 is a synthesis unit configured to synthesize geometry data and occupancy maps. That is, the embedding unit 315 is a generation unit configured to generate geometry data including a special value indicating occupancy map information in the range.

For example, the embedding unit 315 acquires a geometry video frame (Geometry video frame(s)) and a high resolution occupancy map (Occupancy map (1×1)) supplied from the packing unit 312. Further, the embedding unit 315 acquires parameters supplied from the parameter generating unit 314. The embedding unit 315 generates, on the basis of those pieces of information, a geometry video frame including geometry data including a special value, a guard margin, and the like in the range (Geometry video frame(s) w/Guard). The embedding unit 315 supplies the generated geometry video frame (Geometry video frame(s) w/Guard) to the video encoding unit 316.

The video encoding unit 316 performs processing related to the encoding of geometry video frames (Geometry video frame(s) w/Guard). For example, the video encoding unit 316 acquires a geometry video frame (Geometry video frame(s) w/Guard) supplied from the embedding unit 315. Further, the video encoding unit 316 encodes the acquired geometry video frame (Geometry video frame(s) w/Guard) by any two-dimensional image encoding method, for example, AVC or HEVC. The video encoding unit 316 supplies the encoded data obtained by the encoding to the OMap recovering unit 317 or the multiplexer 319.

The OMap recovering unit 317 performs processing related to the recovering of occupancy maps. For example, the OMap recovering unit 317 acquires, from the video encoding unit 316, encoded data on a geometry video frame including geometry data including a special value, a guard margin, and the like in the range (Geometry video frame(s) w/Guard). The OMap recovering unit 317 decodes the encoded data by a decoding method corresponding to encoding performed by the video encoding unit 316 (any two-dimensional image decoding method, for example, AVC or HEVC), to thereby generate the geometry video frame (Geometry video frame(s) w/Guard).

Further, the OMap recovering unit 317 acquires special value-related parameters supplied from the parameter generating unit 314. The OMap recovering unit 317 extracts, using the parameters, occupancy map information from the generated geometry video frame (Geometry video frame(s) w/Guard), to thereby recover a high resolution occupancy map (Occupancy map (1×1)). The OMap recovering unit 317 supplies the recovered high resolution occupancy map to the parameter generating unit 314.

The video encoding unit 318 performs processing related to the encoding of color video frames (Color video frame (s)). For example, the video encoding unit 318 acquires a color video frame supplied from the packing unit 312. Further, the video encoding unit 318 encodes the acquired color video frame by any two-dimensional image encoding method, for example, AVC or HEVC. The video encoding unit 318 supplies the encoded data obtained by the encoding to the multiplexer 319.

The multiplexer 319 performs processing related to multiplexing. For example, the multiplexer 319 acquires encoded data on auxiliary patch information supplied from the auxiliary patch information compressing unit 313. Further, the multiplexer 319 acquires control information associated with packing supplied from the packing unit 312. Moreover, the multiplexer 319 acquires encoded data on a geometry video frame supplied from the video encoding unit 316. Further, the multiplexer 319 acquires encoded data on a color video frame supplied from the video encoding unit 318.

The multiplexer 319 multiplexes those pieces of information acquired to generate a bitstream (Bitstream). That is, the multiplexer 319 generates a bitstream including the encoded data on the geometry data and the special value-related parameters. The multiplexer 319 outputs the generated bitstream to the outside of the encoding apparatus 300.

Note that these processing units (the patch division unit 311 to the multiplexer 319) have any configuration. For example, each processing unit may include a logic circuit configured to achieve the above-mentioned processing. Further, each processing unit may include, for example, a CPU (Central Processing Unit), a ROM (Read Only Memory), or a RAM (Random Access Memory) and execute a program using those portions, to thereby achieve the above-mentioned processing. Needless to say, each processing unit may have both the configurations, and achieve part of the above-mentioned processing by the logic circuit and achieve the remaining by executing the program. The configurations of the processing units may be independent of each other. For example, some of the processing units may achieve part of the above-mentioned processing by the logic circuits, other processing units may achieve the above-mentioned processing by executing the programs, and still other processing units may achieve the above-mentioned processing by using the logic circuits and executing the programs.

<Generation of Parameter>

Next, how the encoding apparatus 300 generates parameters is specifically described. The parameter generating unit 314 sets, as a special value-related parameter, a special value indicating that no projected image (patch) is present in the range of geometry data. For example, the parameter generating unit 314 refers to a geometry video frame supplied from the packing unit 312 and sets a special value on the basis of the distribution of the depth values thereof or the like. The parameter generating unit 314 sets at least one of the minimum value, the maximum value, or the intermediate value of the range of the geometry data as the special value. The parameter generating unit 314 supplies the generated special value to the embedding unit 315.

The embedding unit 315 embeds the supplied special value in the geometry video frame supplied from the packing unit 312. For example, the embedding unit 315 uses, as the special value set by the parameter generating unit 314, the value of geometry data on a position at which no patch is present in a high resolution occupancy map (for example, a pixel having a value of 0 in the high resolution occupancy map) in the geometry video frame. That is, the embedding unit 315 generates the geometry data including, in the range, the special value set by the parameter generating unit 314.

Here, the embedding unit 315 can correct depth values (the range thereof) as needed. For example, in a case where there is no range in which special values or guard margins can be set in the range of geometry data, the embedding unit 315 corrects a depth value (the range thereof). For example, the embedding unit 315 quantizes the depth value to correct the range of the depth value. Further, for example, the embedding unit 315 quantizes the depth value to correct the range of the depth value.

Further, the parameter generating unit 314 sets a guard margin as a special value-related parameter. For example, the parameter generating unit 314 refers to the geometry video frame supplied from the packing unit 312 and sets, on the basis of the distribution of the depth values thereof or the like, a guard margin having a predetermined width between a range indicating depth values and the special value. For example, the parameter generating unit 314 can set the width of the guard margin on the basis of the target rate (QP) of encoding or the like. The parameter generating unit 314 supplies the generated guard margin to the embedding unit 315.

The embedding unit 315 embeds the supplied guard margin in the geometry video frame supplied from the packing unit 312. For example, in the geometry video frame, the embedding unit 315 sets, to geometry data on each pixel, the guard margin (that is, the range in which neither depth value nor special value is present) set by the parameter generating unit 314. The embedding unit 315 can correct depth values as needed as described above. That is, the embedding unit 315 generates the geometry data including the guard margin set by the parameter generating unit 314 in the range.

Further, the parameter generating unit 314 sets, as a special value-related parameter, a threshold (X) for identifying depth values and special values. For example, the parameter generating unit 314 sets the threshold on the basis of geometry data locally decoded (more specifically, a high resolution occupancy map extracted from the geometry data) using the loop of the embedding unit 315, the video encoding unit 316, and the OMap recovering unit 317.

As described above, the embedding unit 315 generates a geometry video frame (Geometry video frame(s) w/Guard), and the video encoding unit 316 generates encoded data thereon. The OMap recovering unit 317 decodes the encoded data and generates a geometry video frame (Geometry video frame(s) w/Guard) having been encoded and decoded.

The parameter generating unit 314 temporarily sets (temporarily generates) the threshold X, and supplies the threshold X to the OMap recovering unit 317 together with the other parameters. The OMap recovering unit 317 extracts, using the parameters supplied from the parameter generating unit 314, occupancy map information from the geometry video frame (Geometry video frame(s) w/Guard) having been encoded and decoded, to thereby recover a high resolution occupancy map (Occupancy map (1×1)). That is, for example, as described with reference to FIG. 7 or the like, the OMap recovering unit 317 obtains a boundary using the parameters such as the special value, the guard margin, and the threshold, and clips geometry data positioned in the guard margin on the basis of the boundary, for example, to thereby extract the occupancy map information. The OMap recovering unit 317 supplies the recovered high resolution occupancy map to the parameter generating unit 314.

The parameter generating unit 314 compares the recovered high resolution occupancy map to a high resolution occupancy map supplied from the packing unit 312 (before encoding and decoding) and evaluates the temporarily set threshold on the basis of the comparison result (map matching degree). In a case where the comparison result does not meet predetermined criteria (the map matching degree is insufficient), the parameter generating unit 314 changes the temporarily set threshold and supplies the changed threshold to the OMap recovering unit 317 so that the high resolution occupancy map is recovered again using the new threshold. The parameter generating unit 314 then compares the high resolution occupancy maps again.

Further, in a case where the comparison result meets the predetermined criteria (the map matching degree is sufficiently high), the parameter generating unit 314 determines the temporarily set threshold as an authoritative value (sets the temporarily set threshold as an ultimate set value). In this case, the parameter generating unit 314 supplies the authoritatively set threshold and the various set parameters such as the special value and the guard margin to the auxiliary patch information compressing unit 313 that transmits (signals) the threshold and the parameters to the decoding side.

<Signaling of Parameter>

The parameters generated as described above are supplied to the multiplexer 319 through the auxiliary patch information compressing unit 313 to be included in a bitstream, and transmitted (signaled) to the decoding side. That is, for example, the parameters including at least one of information indicating the special value, information indicating a margin between a range indicating depth values indicating the position of 3D data and the special value, or information indicating the threshold for identifying the depth values and the special value are signaled.

As described above in <1. High Resolution Occupancy Map>, the signaling can be performed at any frequency. For example, the multiplexer 319 can generate bitstreams including such parameters in units of patches, frames, or sequences.

<Packing Unit>

Figure 14:
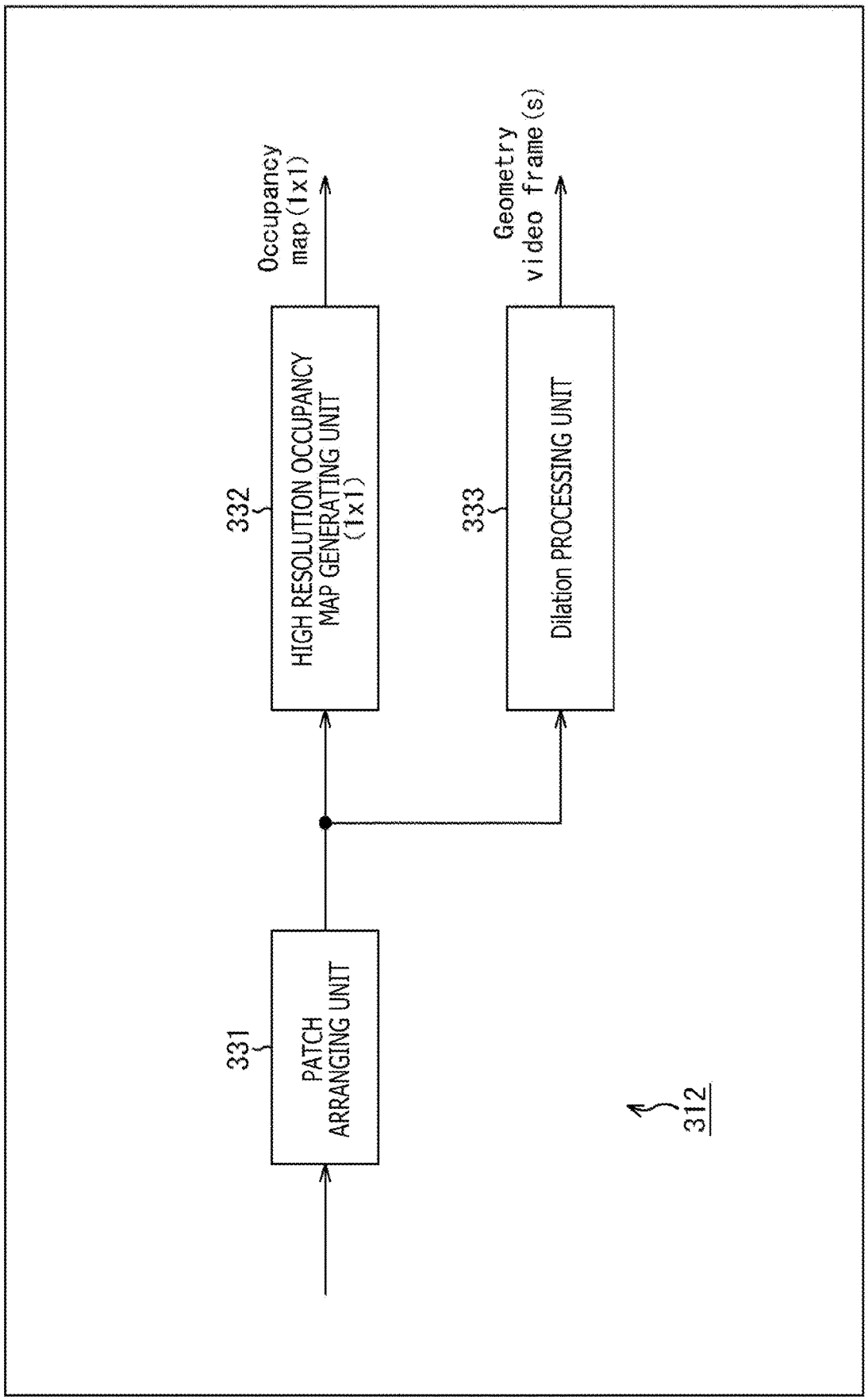
FIG. 14 is a diagram illustrating an example of a main configuration of a packing unit.

FIG. 14 is a block diagram illustrating an example of a main configuration of the packing unit 312 of FIG. 13. As illustrated in FIG. 14, the packing unit 312 includes a patch arranging unit 331, a high resolution occupancy map generating unit 332, and a Dilation processing unit 333.

The patch arranging unit 331 performs processing related to the arrangement of patches. For example, the patch arranging unit 331 acquires data supplied from the patch division unit 311. The patch arranging unit 331 arranges the patches of position information generated by the patch division unit 311 on a two-dimensional image. The patch arranging unit 331 supplies the two-dimensional image having the patches arranged thereon (geometry video frame) to the high resolution occupancy map generating unit 332 and the Dilation processing unit 333.

The high resolution occupancy map generating unit 332 generates, on the basis of a geometry video frame supplied from the patch arranging unit 331, a high resolution occupancy map identifying the presence or absence of patches in units of 1×1 pixels. The high resolution occupancy map generating unit 332 supplies the generated high resolution occupancy map (Occupancy map (1×1)) to the parameter generating unit 314 and the embedding unit 315.

The Dilation processing unit 333 performs Dilation processing on a geometry video frame supplied from the patch arranging unit 331 to extend the pixel value of the outline of each patch in a predetermined direction, thereby filling portions of the two-dimensional image on which no patch has been arranged. The Dilation processing unit 333 supplies the geometry video frame (Geometry video frame(s)) after the Dilation processing to the parameter generating unit 314 and the embedding unit 315.

Note that, although not illustrated, the patch arranging unit 331 and the Dilation processing unit 333 perform similar processing on the patches of attribute information (color video frame) and supply the generated color video frame (Color video frame(s)) to the video encoding unit 318.

Note that these processing units (the patch arranging unit 331 to the Dilation processing unit 333) have any configuration. For example, each processing unit may include a logic circuit configured to achieve the above-mentioned processing. Further, each processing unit may include, for example, a CPU, a ROM, or a RAM and execute a program using those portions, to thereby achieve the above-mentioned processing. Needless to say, each processing unit may have both the configurations, and achieve part of the above-mentioned processing by the logic circuit and achieve the remaining by executing the program. The configurations of the processing units may be independent of each other. For example, some of the processing units may achieve part of the above-mentioned processing by the logic circuits, other processing units may achieve the above-mentioned processing by executing the programs, and still other processing units may achieve the above-mentioned processing by using the logic circuits and executing the programs.

With the configuration as described above, the encoding apparatus 300 can perform encoding as described above in <1. High Resolution Occupancy Map>. Thus, the encoding apparatus 300 can obtain the various effects as described above in <1. High Resolution Occupancy Map>. Thus, the encoding apparatus 300 can prevent, while preventing a reduction in encoding efficiency, a reduction in image quality of a display image obtained by projecting recovered 3D data on a two-dimensional plane.

<Flow of Encoding Processing>

Next, an example of the flow of encoding processing that is executed by the encoding apparatus 300 is described with reference to the flowchart of FIG. 15.

When the encoding processing starts, in Step S301, the patch division unit 311 of the encoding apparatus 300 projects 3D data on a two-dimensional plane to divide the 3D data into patches.

In Step S302, the packing unit 312 executes packing processing to pack the patches of position information and attribute information generated in Step S301 as video frames. Further, the packing unit 312 generates control information associated with the packing.

In Step S303, the parameter generating unit 314 to the OMap recovering unit 317 execute parameter setting processing to generate special value-related parameters.

In Step S304, the embedding unit 315 embeds, using the parameters generated by the processing in Step S303, the high resolution occupancy map generated by the processing in Step S302 in the geometry video frame generated by the processing in Step S302. That is, the embedding unit 315 generates, by this processing, geometry data that is a frame image having arranged thereon the projected image obtained by projecting 3D data representing a three-dimensional structure on a two-dimensional plane and that includes a special value indicating occupancy map information in the range.

In Step S305, the video encoding unit 316 encodes the geometry video frame including the occupancy map information, which has been generated by the processing in Step S304.

In Step S306, the video encoding unit 318 encodes the color video frame generated by the processing in Step S302.

In Step S307, the auxiliary patch information compressing unit 313 compresses the auxiliary patch information generated by the processing in Step S301 and the parameters generated by the processing in Step S303.

In Step S308, the multiplexer 319 multiplexes the various types of information generated as described above (for example, the encoded data generated in Step S305 to Step S307, and the control information associated with packing, which is generated in Step S302), to thereby generate a bitstream including these pieces of information.

In Step S309, the multiplexer 319 outputs the bitstream generated in Step S308 to the outside of the encoding apparatus 300.

When the processing in Step S309 ends, the encoding processing ends.

<Flow of Packing Processing>

Figure 15:
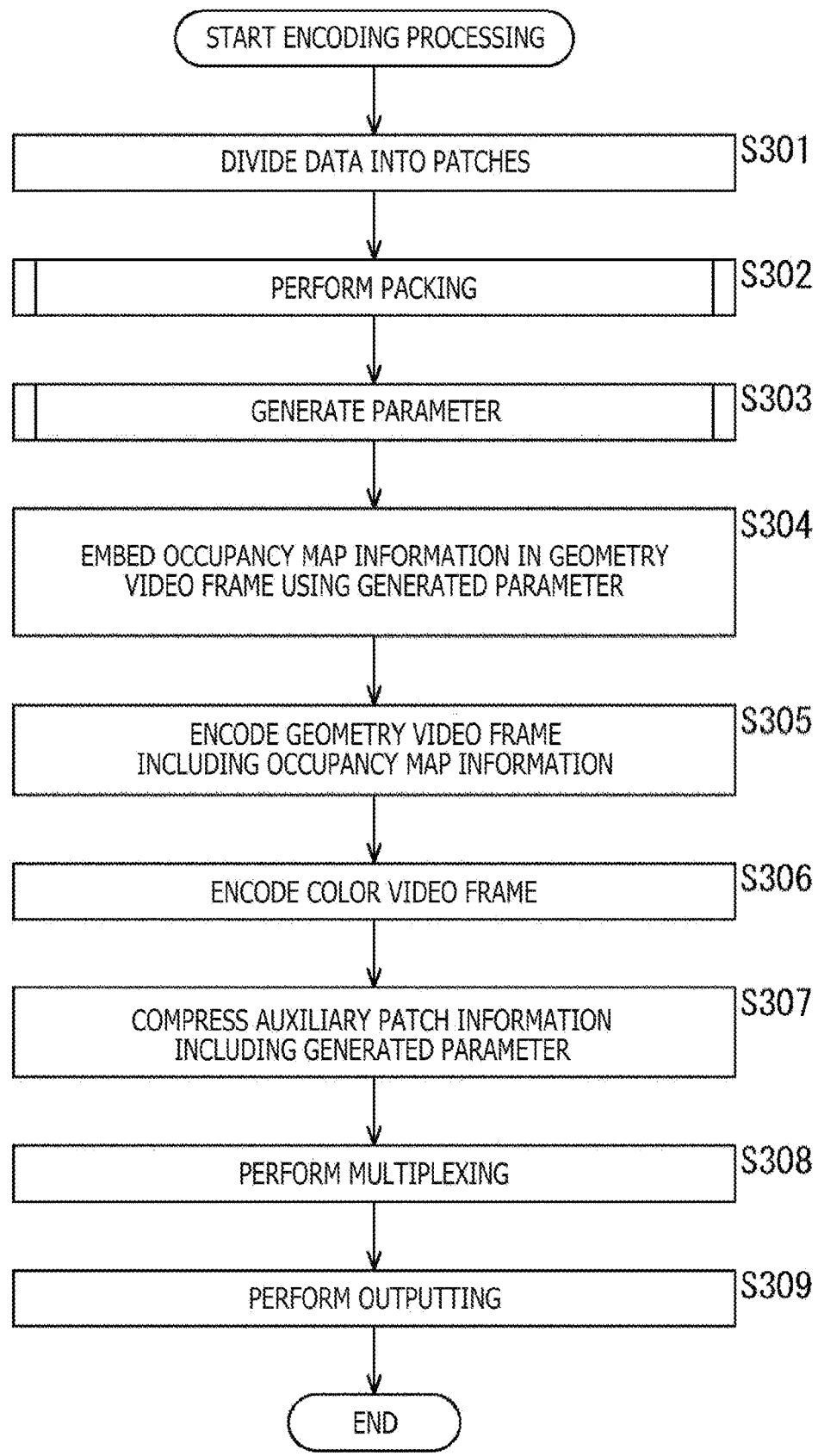
FIG. 15 is a flowchart illustrating an example of the flow of encoding processing.
Figure 16:
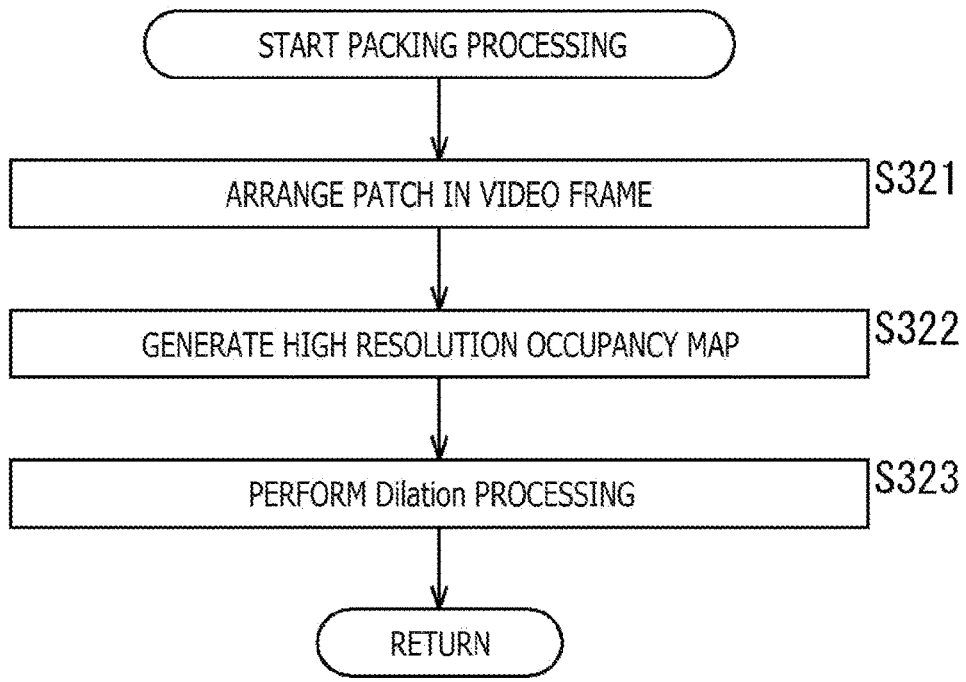
FIG. 16 is a flowchart illustrating an example of the flow of packing processing.

Next, an example of the flow of the packing processing that is executed in Step S302 of FIG. 15 is described with reference to the flowchart of FIG. 16.

When the packing processing starts, in Step S321, the patch arranging unit 331 arranges patches on video frames to generate a geometry video frame and a color video frame.

In Step S322, the high resolution occupancy map generating unit 332 generates a high resolution occupancy map using the geometry video frame generated by the processing in Step S321.

In Step S323, the Dilation processing unit 333 performs Dilation processing on the geometry video frame and the color video frame generated by the processing in Step S321.

When the processing in Step S333 ends, the packing processing ends, and the processing returns to FIG. 15.

<Flow of Parameter Setting Processing>

Next, an example of the flow of the parameter setting processing that is executed in Step S302 of FIG. 15 is described with reference to the flowcharts of FIG. 17 and FIG. 18.

Figure 17:
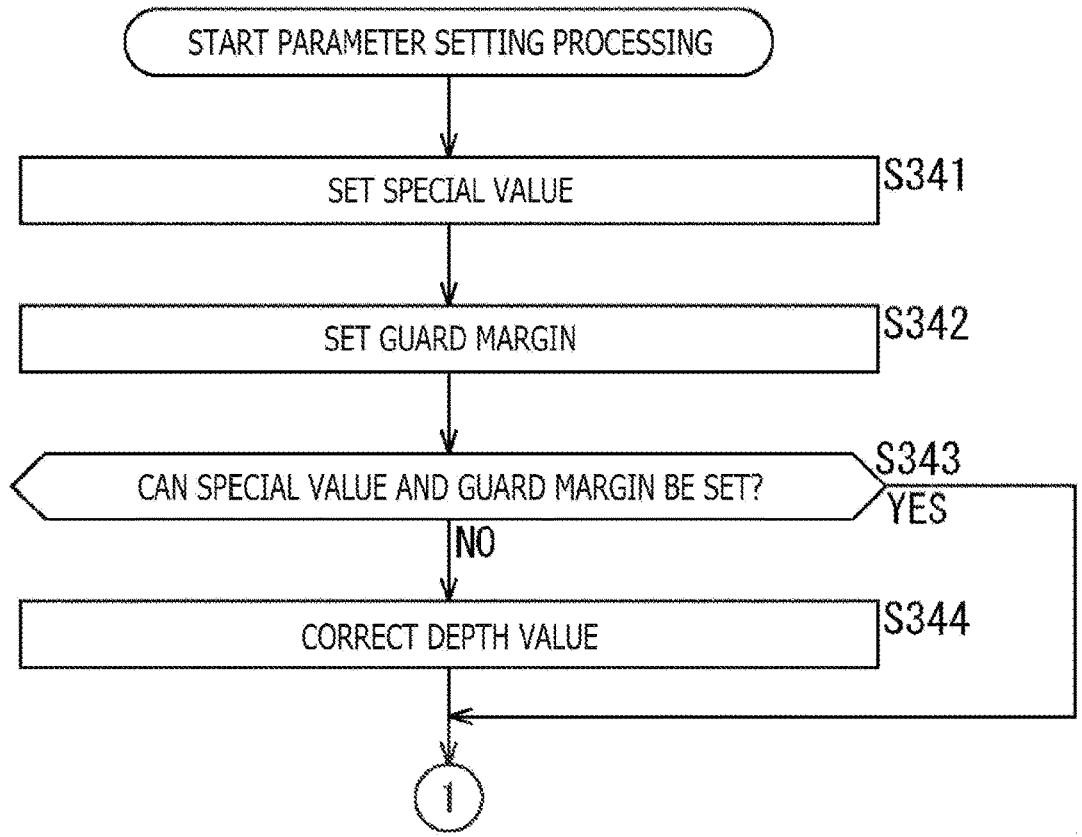
FIG. 17 is a flowchart illustrating an example of the flow of parameter setting processing.

When the parameter setting processing starts, in Step S341 of FIG. 17, the parameter generating unit 314 sets a special value to the range of geometry data.

In Step S342, the parameter generating unit 314 sets a guard margin to the range of the geometry data on the basis of the target rate (QP) of encoding, for example.

In Step S343, the parameter generating unit 314 determines whether or not the special value and the guard margin set in Step S341 and Step S342 can be set to a geometry video frame. In a case where it is determined that, on the basis of, for example, the distribution of depth values, the special value and the guard margin cannot be set, the processing proceeds to Step S344.

In Step S344, the parameter generating unit 314 quantizes or shifts the depth values, for example, to correct the depth values, thereby securing a free range such that the special value and the guard margin can be set.

Figure 18:
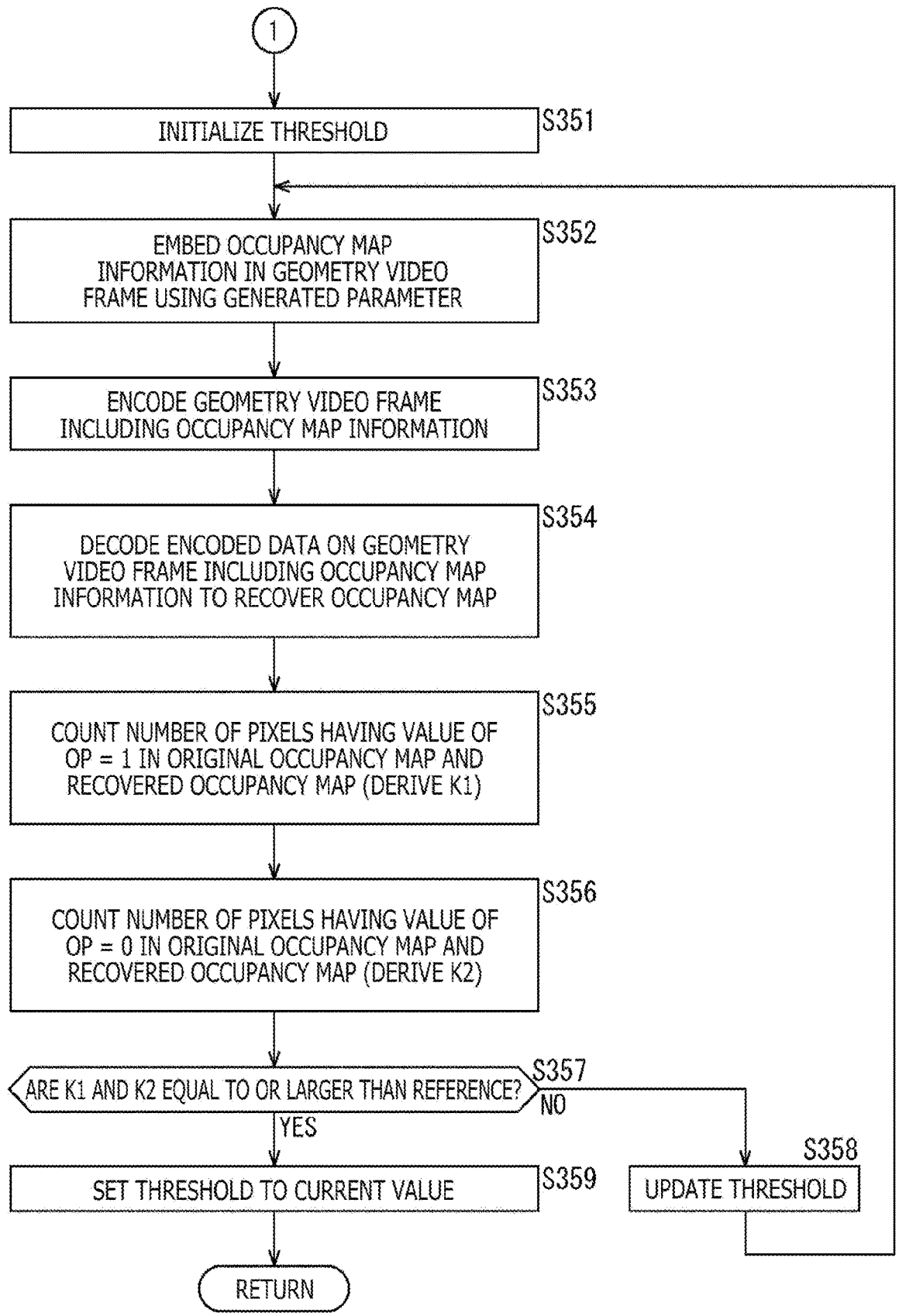
FIG. 18 is a flowchart illustrating an example of the flow of the parameter setting processing, which is a continuation of FIG. 17.

When the processing in Step S344 ends, the processing proceeds to Step S351 of FIG. 18. Further, in a case where it is determined that the special value and the guard margin can be set in Step S343 of FIG. 17, the processing in Step S344 is skipped, and the processing proceeds to Step S351 of FIG. 18.

In Step S351 of FIG. 18, the parameter generating unit 314 initializes the threshold (X) (temporarily sets the threshold (X) to an initial value).

In Step S352, the embedding unit 315 embeds occupancy map information in the geometry video frame using the parameters (special value and guard margin) generated by the processing in Step S341 and Step S342 of FIG. 17.

In Step S353, the video encoding unit 316 encodes the geometry video frame (Geometry video frame(s) w/Guard) including the occupancy map information, which has been generated in Step S352.

In Step S354, the OMap recovering unit 317 decodes the encoded data on the geometry video frame including the occupancy map information, which has been generated in Step S353. Moreover, the OMap recovering unit 317 recovers, from the geometry video frame including the occupancy map information, which has been generated by the decoding, a high resolution occupancy map using the special value generated by the processing in Step S341 of FIG. 17, the guard margin generated by the processing in Step S342, the threshold (X) (current temporarily set value), and the like.

In Step S355, the parameter generating unit 314 compares the original high resolution occupancy map before encoding and decoding (the high resolution occupancy map generated by the processing in Step S302) to the recovered high resolution occupancy map (the high resolution occupancy map generated by the processing in Step S354), to thereby count the number of pixels having a value of 1 (OP=1) in both the maps (derive a count value K1).

In Step S356, the parameter generating unit 314 compares the original high resolution occupancy map before encoding and decoding (the high resolution occupancy map generated by the processing in Step S302) to the recovered high resolution occupancy map (the high resolution occupancy map generated by the processing in Step S354), to thereby count the number of pixels having a value of 0 (OP=0) in both the maps (derive a count value K2).

In Step S357, the parameter generating unit 314 determines whether or not the count value K1 derived in Step S355 and the count value K2 derived in Step S356 are equal to or larger than a predetermined reference. In a case where it is determined that one or both of the count values K1 and K2 are not equal to or larger than the predetermined reference, the processing proceeds to Step S358.

In Step S358, the parameter generating unit 314 updates the temporarily set value of the threshold (X). When the temporarily set value of the threshold is updated, the processing returns to Step S354, and the subsequent processing is executed using the threshold having the new temporarily set value. That is, until it is determined that the count values K1 and K2 are equal to or larger than the predetermined reference in Step S357, the processing processes in Step S354 to Step S358 are repeatedly executed while the temporarily set value of the threshold is updated.

Then, in a case where it is determined that the count values K1 and K2 are equal to or larger than the predetermined reference in Step S357, the processing proceeds to Step S359.

In Step S359, the parameter generating unit 314 sets a current temporarily set value as the authoritative set value of the threshold (X). When the processing in Step S359 ends, the parameter setting processing ends, and the processing returns to FIG. 15.

By executing the processing as described above, the encoding apparatus 300 can perform encoding as described above in <1. High Resolution Occupancy Map>. Thus, the encoding apparatus 300 can obtain the various effects as described above in <1. High Resolution Occupancy Map>. Thus, the encoding apparatus 300 can prevent, while preventing a reduction in encoding efficiency, a reduction in image quality of a display image obtained by projecting recovered 3D data on a two-dimensional plane.

3. Second Embodiment

<Decoding Apparatus>

Figure 19:
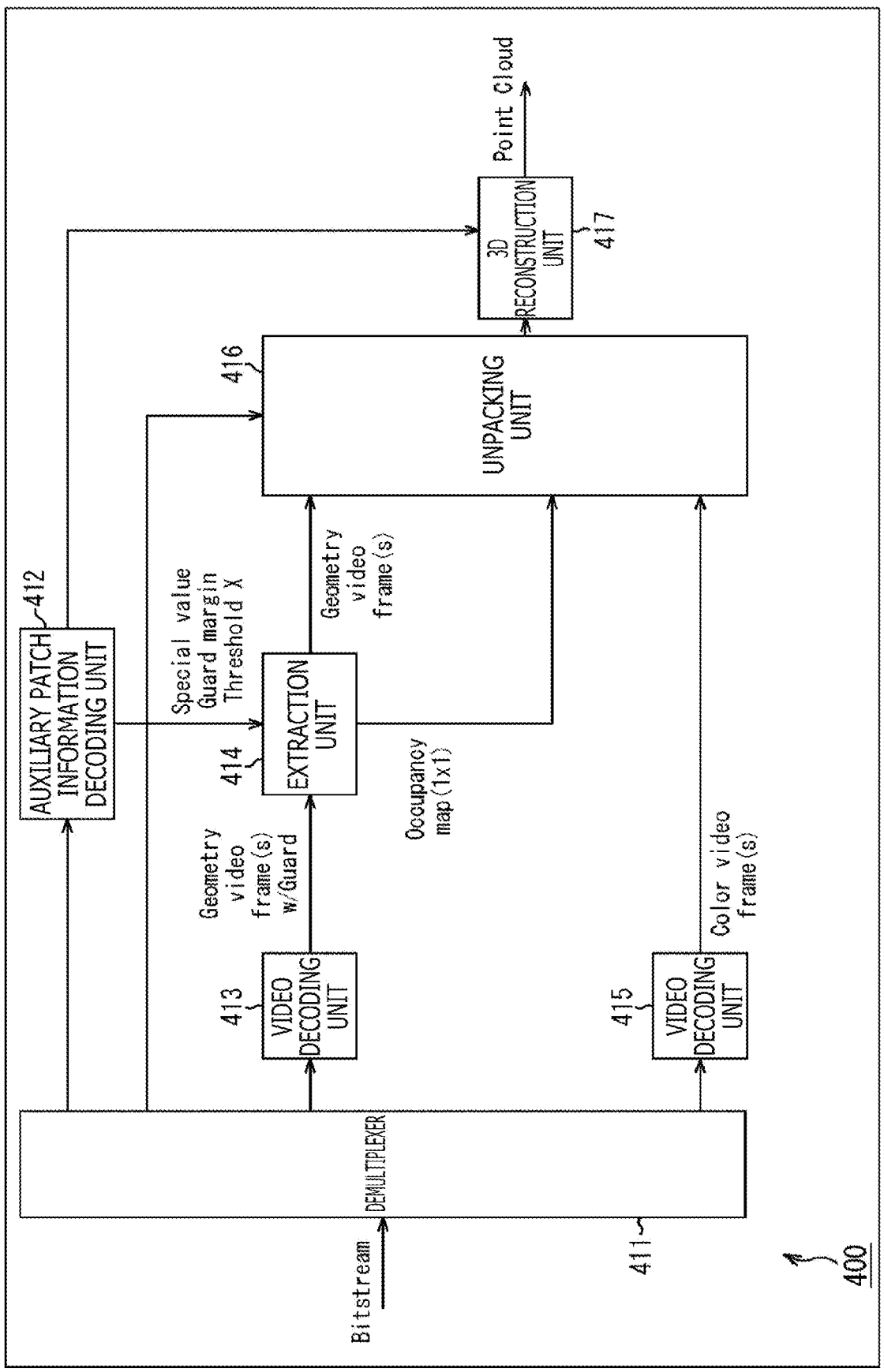
FIG. 19 is a block diagram illustrating an example of a main configuration of a decoding apparatus.

FIG. 19 is a block diagram illustrating an example of the configuration of a decoding apparatus that is an aspect of the image processing apparatus to which the present technology has been applied. A decoding apparatus 400 illustrated in FIG. 19 is an apparatus configured to decode, by a two-dimensional image decoding method, encoded data obtained by projecting 3D data such as a point cloud on a two-dimensional plane to encode the 3D data, to thereby reconstruct the 3D data (a decoding apparatus to which the video-based approach has been applied). The decoding apparatus 400 is a decoding apparatus corresponding to the encoding apparatus 300 of FIG. 13 and can decode bitstreams generated by the encoding apparatus 300 to reconstruct 3D data.

Note that FIG. 19 illustrates the processing units, the flow of data, and like, which are principal, and FIG. 19 does not necessarily illustrate everything. That is, in the decoding apparatus 400, there may be processing units that are not illustrated as blocks in FIG. 19, or there may be processing or the flow of data that are not illustrated as arrows or the like in FIG. 19.

As illustrated in FIG. 19, the decoding apparatus 400 includes a demultiplexer 411, an auxiliary patch information decoding unit 412, a video decoding unit 413, an extraction unit 414, a video decoding unit 415, an unpacking unit 416, and a 3D reconstruction unit 417.

The demultiplexer 411 performs processing related to the inverse multiplexing of data. For example, the demultiplexer 411 acquires a bitstream input to the decoding apparatus 400. The bitstream is supplied from the encoding apparatus 300, for example. The demultiplexer 411 inversely multiplexes the bitstream to extract encoded data on auxiliary patch information and supplies the encoded data to the auxiliary patch information decoding unit 412. Further, the demultiplexer 411 extracts encoded data on a geometry video frame from the bitstream by the inverse multiplexing and supplies the encoded data to the video decoding unit 413. Moreover, the demultiplexer 411 extracts encoded data on a color video frame from the bitstream by the inverse multiplexing and supplies the encoded data to the video decoding unit 415. Further, the demultiplexer 411 extracts control information associated with packing from the bitstream by the inverse multiplexing and supplies the control information to the unpacking unit 416.

The auxiliary patch information decoding unit 412 performs processing related to the decoding of encoded data on auxiliary patch information or the like. For example, the auxiliary patch information decoding unit 412 acquires encoded data supplied from the demultiplexer 411. Further, the auxiliary patch information decoding unit 412 decodes the acquired encoded data to generate auxiliary patch information. The auxiliary patch information includes special value-related parameters or the like. The auxiliary patch information decoding unit 412 supplies the generated auxiliary patch information to the 3D reconstruction unit 417. Further, the auxiliary patch information decoding unit 412 supplies the special value-related parameters to the extraction unit 414. The special value-related parameters include, for example, the special value, the guard margin, or the threshold X.

The video decoding unit 413 performs processing related to the decoding of encoded data on geometry video frames. For example, the video decoding unit 413 acquires encoded data on a geometry video frame supplied from the demultiplexer 411. Further, the video decoding unit 413 decodes the encoded data to generate a geometry video frame including occupancy map information (Geometry video frame(s) w/Guard). That is, the video decoding unit 413 decodes encoded data on geometry data that is a frame image having arranged thereon a projected image obtained by projecting 3D data representing a three-dimensional structure on a two-dimensional plane and that includes a special value indicating occupancy map information in the range. Moreover, the video decoding unit 413 supplies the geometry video frame to the extraction unit 414.

The extraction unit 414 performs processing related to the extraction of occupancy map information. For example, the extraction unit 414 acquires a geometry video frame (Geometry video frame(s) w/Guard) supplied from the video decoding unit 413. Further, the extraction unit 414 acquires special value-related parameters supplied from the auxiliary patch information decoding unit 412.

Moreover, the extraction unit 414 extracts, using the special value-related parameters, occupancy map information from the geometry video frame to generate a high resolution occupancy map (Occupancy map (1×1)) and a geometry video frame (Geometry video frame(s)) including no occupancy map information. In other words, the extraction unit 414 extracts, from the geometry video frame including the occupancy map information, the high resolution occupancy map and the geometry video frame including no occupancy map information. That is, the extraction unit 414 separates the high resolution occupancy map from the geometry video frame.

That is, the extraction unit 414 extracts, from geometry data that is a frame image having arranged thereon a projected image obtained by projecting 3D data representing a three-dimensional structure on a two-dimensional plane and that includes a special value indicating occupancy map information in the range, a depth value indicating the position of the 3D data and the occupancy map information. For example, the extraction unit 414 extracts, on the basis of special value-related parameters, the depth value and the special value. Note that, in a case where depth values (a range indicating the depth values) have been corrected when a special value is set to the range of geometry data, the extraction unit 414 can inversely correct the extracted depth values.

Further, the extraction unit 414 supplies the generated high resolution occupancy map (Occupancy map (1×1)) and geometry video frame (Geometry video frame(s)) to the unpacking unit 416.

The video decoding unit 415 performs processing related to the decoding of encoded data on color video frames. For example, the video decoding unit 415 acquires encoded data on a color video frame supplied from the demultiplexer 411. Further, the video decoding unit 415 decodes the encoded data to generate the color video frame. Moreover, the video decoding unit 415 supplies the generated color video frame (Color video frame(s)) to the unpacking unit 416.

The unpacking unit 416 performs processing related to unpacking. For example, the unpacking unit 416 acquires control information associated with packing supplied from the demultiplexer 411. Further, the unpacking unit 416 acquires high resolution occupancy map (Occupancy map (1×1)) and geometry video frame (Geometry video frame(s)) supplied from the extraction unit 414. Moreover, the unpacking unit 416 acquires a color video frame (Color video frame(s)) supplied from the video decoding unit 415.

Further, the unpacking unit 416 unpacks the geometry video frame and the color video frame on the basis of the control information associated with packing and the high resolution occupancy map. Moreover, the unpacking unit 416 supplies the patches and the like of position information and attribute information obtained by the unpacking to the 3D reconstruction unit 417.

The 3D reconstruction unit 417 performs processing related to the reconstruction of 3D data. For example, the 3D reconstruction unit 417 reconstructs 3D data (for example, point cloud) on the basis of auxiliary patch information supplied from the auxiliary patch information decoding unit 412, patches supplied from the unpacking unit 416, and the like. Further, the 3D reconstruction unit 417 outputs the 3D data obtained by such processing to the outside of the decoding apparatus 400.

The 3D data is supplied to a display unit where the image of the 3D data is displayed, is recorded on a recording medium, or is supplied to another apparatus through communication, for example.

Note that these processing units (the demultiplexer 411 to the 3D reconstruction unit 417) have any configuration. For example, each processing unit may include a logic circuit configured to achieve the above-mentioned processing. Further, each processing unit may include, for example, a CPU, a ROM, or a RAM and execute a program using those portions, to thereby achieve the above-mentioned processing. Needless to say, each processing unit may have both the configurations, and achieve part of the above-mentioned processing by the logic circuit and achieve the remaining by executing the program. The configurations of the processing units may be independent of each other. For example, some of the processing units may achieve part of the above-mentioned processing by the logic circuits, other processing units may achieve the above-mentioned processing by executing the programs, and still other processing units may achieve the above-mentioned processing by using the logic circuits and executing the programs.

With the configuration as described above, the decoding apparatus 400 can perform decoding as described above in <1. High Resolution Occupancy Map>. Thus, the decoding apparatus 400 can obtain the various effects as described above in <1. High Resolution Occupancy Map>. Thus, the decoding apparatus 400 can prevent, while preventing a reduction in encoding efficiency, a reduction in image quality of a display image obtained by projecting recovered 3D data on a two-dimensional plane.

<Flow of Decoding Processing>

Figure 20:
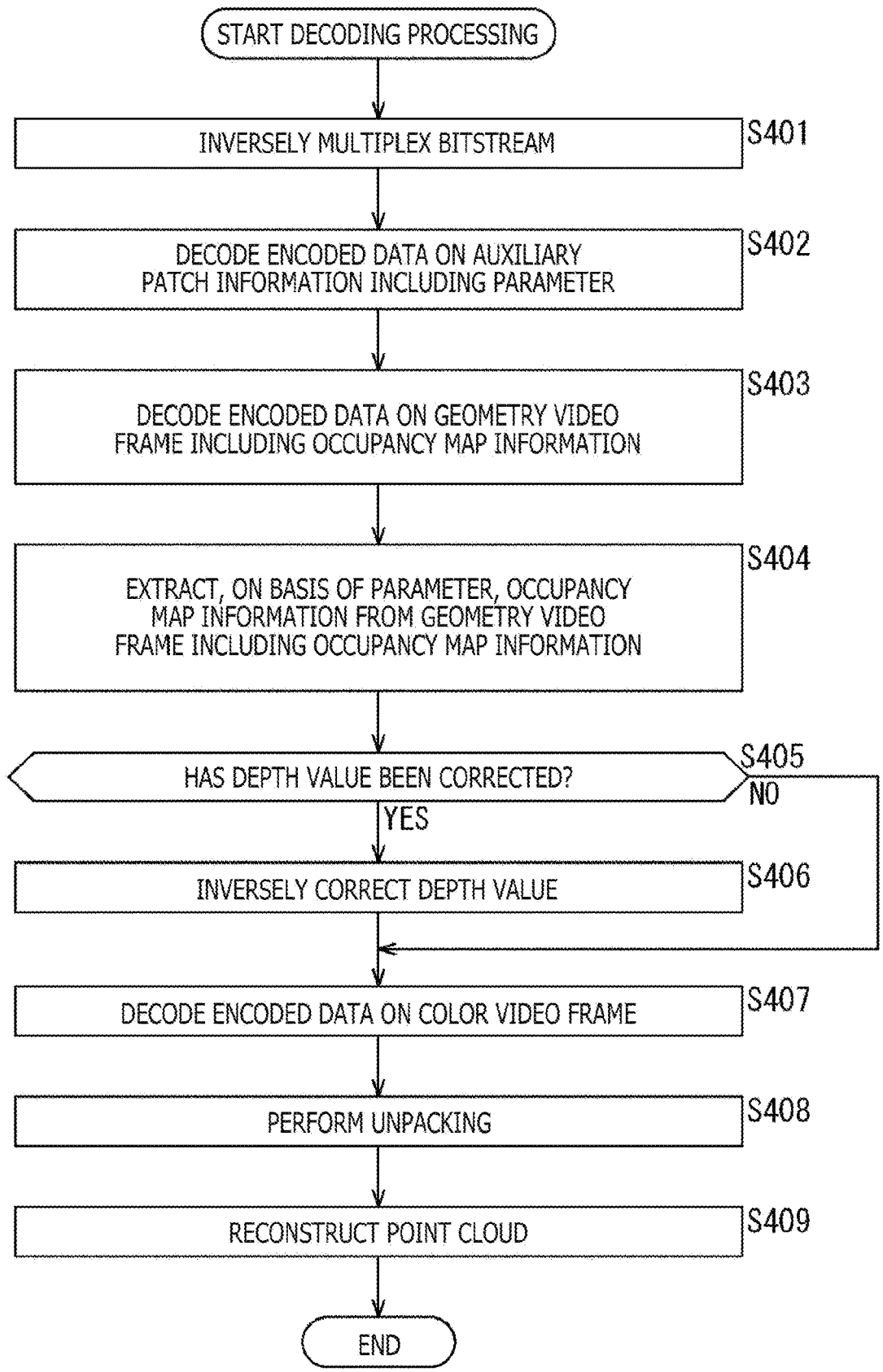
FIG. 20 is a flowchart illustrating an example of the flow of decoding processing.

Next, an example of the flow of decoding processing that is executed by the decoding apparatus 400 is described with reference to the flowchart of FIG. 20.

When the decoding processing starts, in Step S401, the demultiplexer 411 of the decoding apparatus 400 inversely multiplexes a bitstream.

In Step S402, the auxiliary patch information decoding unit 412 decodes encoded data on auxiliary patch information extracted from the bitstream by the processing in Step S401, to thereby generate the auxiliary patch information.

In Step S403, the video decoding unit 413 decodes encoded data on a geometry video frame including occupancy map information, which has been extracted from the bitstream by the processing in Step S401, to thereby generate the geometry video frame including the occupancy map information.

In Step S404, the extraction unit 414 extracts, using special value-related parameters included in the auxiliary patch information generated in Step S402, the occupancy map information from the geometry video frame including the occupancy map information, which has been generated by the processing in Step S403, to thereby generate a high resolution occupancy map and a geometry video frame including no occupancy map information (Geometry video frame(s)). That is, the extraction unit 414 extracts the depth values and the occupancy map information.

In Step S405, the extraction unit 414 determines, on the basis of the special value-related parameters or the like, whether or not the depth values have been corrected in encoding. For example, in a case where it is determined that the depth values have been corrected, the processing proceeds to Step S406.

In Step S406, the extraction unit 414 inversely corrects the depth values. When the processing in Step S406 ends, the processing proceeds to Step S407. Further, in a case where it is determined in Step S405 that the depth values have not been corrected, the processing in Step S406 is skipped, and the processing proceeds to Step S407.

In Step S407, the video decoding unit 415 decodes encoded data on a color video frame extracted from the bitstream in Step S401.

In Step S408, the unpacking unit 416 unpacks the geometry video frame and the color video frame, to thereby extract patches.

In Step S409, the 3D reconstruction unit 417 reconstructs 3D data such as a point cloud using, for example, the patches extracted by the processing in Step S408.

When the processing in Step S409 ends, the decoding processing ends.

By executing the processing as described above, the decoding apparatus 400 can perform decoding as described above in <1. High Resolution Occupancy Map>. Thus, the decoding apparatus 400 can obtain the various effects as described above in <1. High Resolution Occupancy Map>. Thus, the decoding apparatus 400 can prevent, while preventing a reduction in encoding efficiency, a reduction in image quality of a display image obtained by projecting recovered 3D data on a two-dimensional plane.

4. Locally High Resolution Occupancy Map

<Application of High Resolution Occupancy Map to Certain Region>

The high resolution occupancy map described above may be applied to a certain region of a video frame. That is, as illustrated in the uppermost row of Table 500 of FIG. 21, there may be generated geometry data including a special value indicating occupancy map information in the range of geometry data in a certain region.

Accordingly, with regard to the certain region, a higher resolution occupancy map (for example, in units of 1×1 pixels) can be transmitted to the decoding side. That is, the decoder can perform decoding using the higher resolution occupancy map with regard to the certain region. In other words, the decoder can grasp, with regard to the certain region, the presence or absence of patches at the higher resolution (in units of smaller regions). Thus, for example, with regard to the certain region, a reduction in image quality of a display image obtained by projecting recovered 3D data on a two-dimensional plane can be prevented (typically, the image quality can be enhanced).

Note that, in general, as a region to which a special value is applied is narrowed, the number of depth values is reduced, so that a possibility that a range to which the special value and a guard margin can be set is increased increases. That is, as a region to which the special value is applied is narrowed, a possibility that the special value and the guard margin can be set without depth value correction increases. Thus, as a region to which the special value is applied is narrowed, a possibility that a reduction in encoding efficiency can be prevented increases.

The certain region may be any region. For example, the certain region may be set in advance, or the encoder or the like may set the certain region. Further, the setting method may be any method. For example, as illustrated in the left part of the second to fourth rows from the top of Table 500 of FIG. 21, a special value may be included in regions satisfying predetermined conditions. That is, there may be generated geometry data including a special value in the range of data in a certain region satisfying the predetermined conditions of a frame image.

The conditions are set as desired. For example, there may be generated geometry data including a special value in the range of data in a region based on occupancy map information at a resolution lower than the geometry data.

Figure 21:
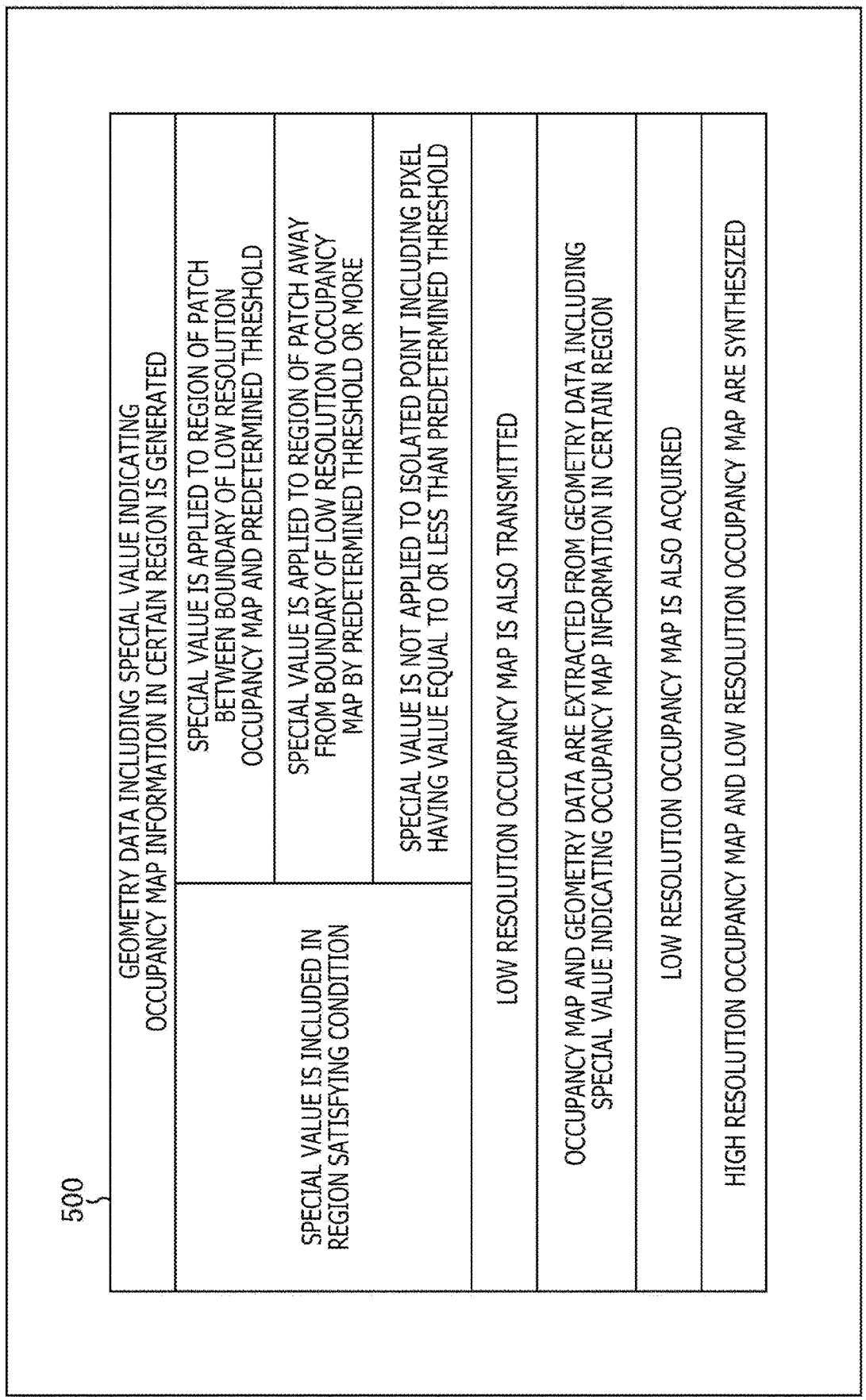
FIG. 21 is a diagram illustrating an example of a point cloud encoding method.

For example, as illustrated in the second row from the top of Table 500 of FIG. 21, a special value may be applied to a region of a patch between the boundary of a low resolution occupancy map and a predetermined threshold. In general, when an occupancy map is at a resolution lower than geometry data, the reproducibility of the outward forms of patches is reduced. That is, near patch boundaries indicated by the occupancy map (boundary between a region having a value of 1 and a region having a value of 0), the presence or absence of geometry data often erroneously determined, with the result that the image quality of a display image obtained by projecting recovered 3D data on a two-dimensional plane is possibly reduced. Thus, the resolution of an occupancy map near patch boundaries may be increased using the conditions as described above. Accordingly, the reproducibility of the outward forms of patches can be enhanced. That is, a reduction in image quality of a display image obtained by projecting recovered 3D data on a two-dimensional plane can be prevented (typically, the image quality can be enhanced).

Further, for example, as illustrated in the third row from the top of Table 500 of FIG. 21, a special value may be applied to a region of a patch away from the boundary of a low resolution occupancy map by a predetermined threshold or more. For example, in a case where there is a small region in which no geometry data is present inside a patch, when an occupancy map is at a resolution lower than the geometry data, such a region is difficult to reproduce, with the result that the image quality of a display image obtained by projecting recovered 3D data on a two-dimensional plane is possibly reduced. Thus, the resolution of an occupancy map inside a patch may be increased using the conditions as described above. Accordingly, the reproducibility of the region inside the patch can be enhanced. That is, a reduction in image quality of a display image obtained by projecting recovered 3D data on a two-dimensional plane can be prevented (typically, the image quality can be enhanced).

Moreover, for example, as illustrated in the fourth row from the top of Table 500 of FIG. 21, a special value may not be applied to an isolated point including a pixel having a value equal to or less than a predetermined threshold. For example, in a geometry video frame, small regions in which geometry data is present are sometimes generated outside patches (isolated points) due to the effect of noise or the like. When the resolution of an occupancy map is increased, such isolated points are also reproduced, with the result that the image quality of a display image obtained by projecting recovered 3D data on a two-dimensional plane is possibly reduced. Thus, the resolution of an occupancy map corresponding to such isolated points may be decreased (prevented from being increased) using the conditions as described above. Accordingly, the reproduction of unnecessary isolated points can be prevented. That is, a reduction in image quality of a display image obtained by projecting recovered 3D data on a two-dimensional plane can be prevented (typically, the image quality can be enhanced).

Note that, as illustrated in the fifth row from the top of Table 500 of FIG. 21, an occupancy map at a resolution lower than geometry data may be transmitted to the decoding side. For example, a low resolution occupancy map (included in a bitstream) may be transmitted to the decoding side as information different from a geometry video frame and a color video frame as in the case of the related art.

<Extraction of Occupancy Map Applied to Certain Region and Geometry Data>

Further, on the decoding side, as illustrated in the sixth row from the top of Table 500 of FIG. 21, an occupancy map and geometry data may be extracted from geometry data including a special value indicating occupancy map information in the range in a certain region as described above. In other words, the occupancy map may be separated from the geometry data (geometry video frame).

Further, as illustrated in the seventh row from the top of Table 500 of FIG. 21, an occupancy map at a resolution lower than geometry data may also be acquired. Moreover, as illustrated in the eighth row from the top of Table 500 of FIG. 21, a high resolution occupancy map and a low resolution occupancy map may be synthesized. That is, a high resolution occupancy map extracted from a geometry video frame and a low resolution occupancy map which is transmitted as information different from the geometry video frame and a color video frame may be synthesized. When unpacking is performed using the occupancy maps synthesized as described above, patches can be extracted more accurately than in a case where a low resolution occupancy map is used, with the result that a reduction in image quality of a display image obtained by projecting recovered 3D data on a two-dimensional plane can be prevented (typically, the image quality can be enhanced).

5. Third Embodiment

<Encoding Apparatus>

Figure 22:
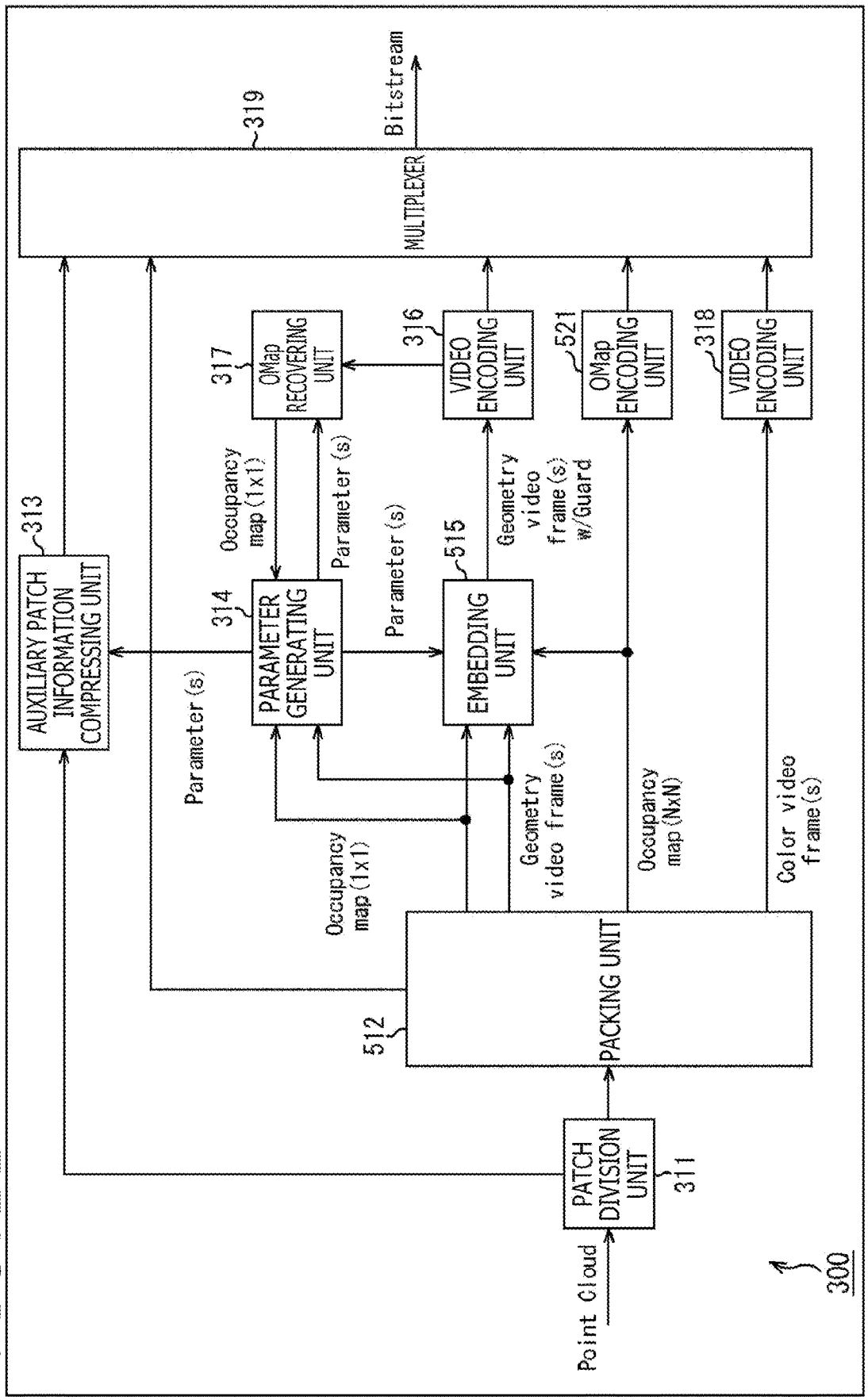
FIG. 22 is a block diagram illustrating an example of a main configuration of the encoding apparatus.

FIG. 22 is a block diagram illustrating an example of a main configuration of the encoding apparatus 300 in this case. The encoding apparatus 300 in this case includes, unlike the example of FIG. 13, a packing unit 512 instead of the packing unit 312 and an embedding unit 515 instead of the embedding unit 315. Moreover, the encoding apparatus 300 in this case includes an OMap encoding unit 521.

The packing unit 512 performs processing similar to that of the packing unit 312 and generates a low resolution occupancy map (Occupancy map (N×N)) indicating the presence or absence of patches in units of regions including NxN pixels. The packing unit 312 supplies the low resolution occupancy map to the embedding unit 515 and the OMap encoding unit 521.

The embedding unit 515 performs processing related to the embedding of occupancy maps in geometry data like the embedding unit 315. However, the embedding unit 515 embeds a special value indicating occupancy map information in the range of geometry data in a certain region. For example, the embedding unit 515 acquires geometry video frame (Geometry video frame(s)), high resolution occupancy map (Occupancy map (1×1)), and low resolution occupancy map (Occupancy map (N×N)) supplied from the packing unit 512. Further, the embedding unit 515 acquires parameters supplied from the parameter generating unit 314.

The embedding unit 515 generates, on the basis of those pieces of information, in the certain region, a geometry video frame including geometry data including a special value, a guard margin, and the like in the range (Geometry video frame(s) w/Guard). For example, the embedding unit 515 generates the geometry data including the special value in the range in a region satisfying predetermined conditions. For example, the embedding unit 515 generates the geometry data including the special value in the range in a region based on the low resolution occupancy map. The embedding unit 515 supplies the generated geometry video frame (Geometry video frame(s) w/Guard) to the video encoding unit 316.

The OMap encoding unit 521 performs processing related to the encoding of occupancy maps. For example, the OMap encoding unit 521 acquires a low resolution occupancy map supplied from the packing unit 512. The OMap encoding unit 521 encodes the low resolution occupancy map by any encoding method such as arithmetic coding to generate encoded data. The OMap encoding unit 521 supplies the generated encoded data to the multiplexer 319.

Note that the processing units of the encoding apparatus 300 illustrated in FIG. 22 have any configuration. For example, each processing unit may include a logic circuit configured to achieve the above-mentioned processing. Further, each processing unit may include, for example, a CPU, a ROM, or a RAM and execute a program using those portions, to thereby achieve the above-mentioned processing. Needless to say, each processing unit may have both the configurations, and achieve part of the above-mentioned processing by the logic circuit and achieve the remaining by executing the program. The configurations of the processing units may be independent of each other. For example, some of the processing units may achieve part of the above-mentioned processing by the logic circuits, other processing units may achieve the above-mentioned processing by executing the programs, and still other processing units may achieve the above-mentioned processing by using the logic circuits and executing the programs.

<Packing Unit>

Figure 23:
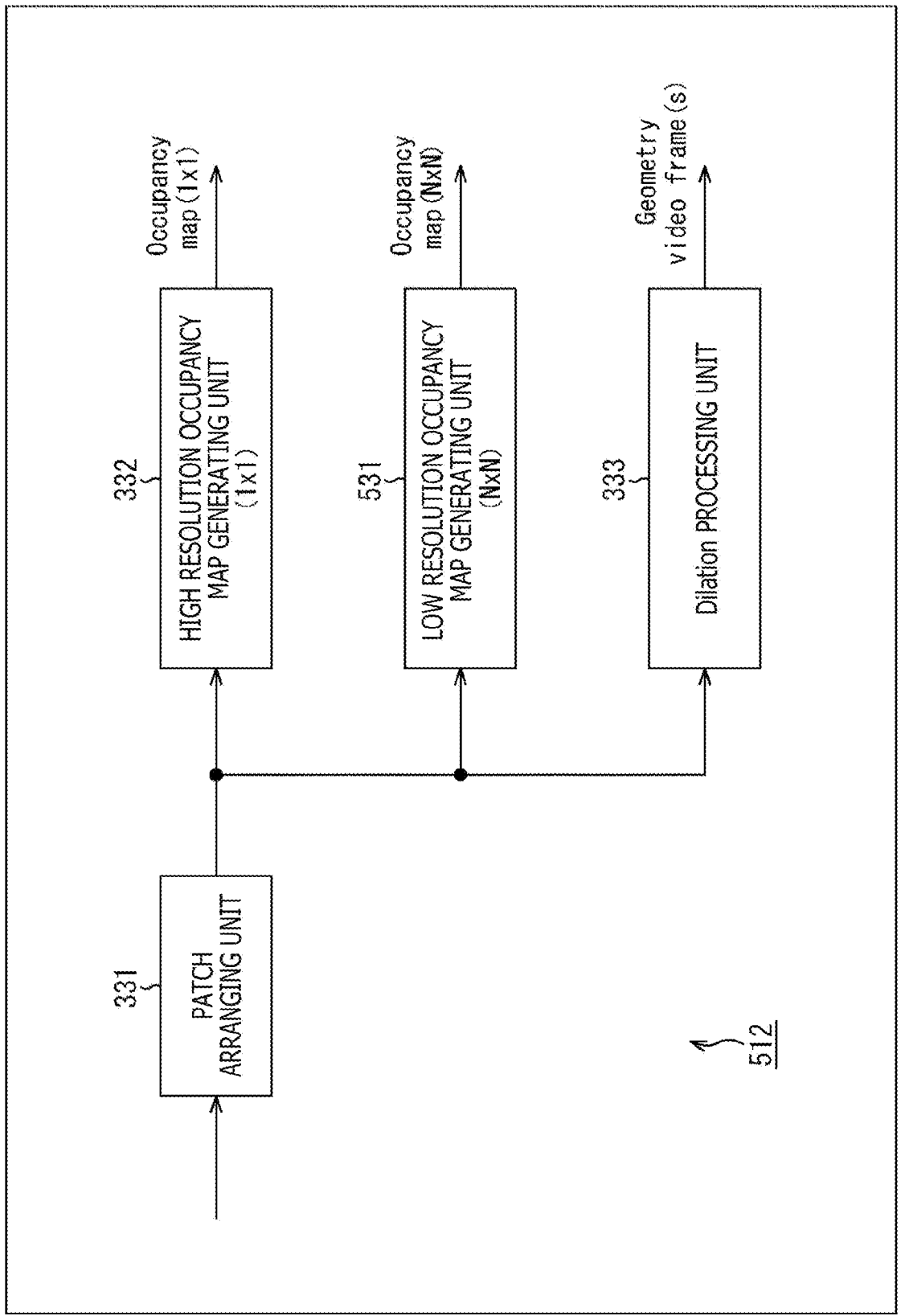
FIG. 23 is a diagram illustrating an example of a main configuration of a packing unit.

FIG. 23 is a block diagram illustrating an example of a main configuration of the packing unit 512 of FIG. 22. As illustrated in FIG. 23, the packing unit 512 includes a low resolution occupancy map generating unit 531 in addition to the processing units of the packing unit 312 (FIG. 14).

The low resolution occupancy map generating unit 531 generates, on the basis of a geometry video frame supplied from the patch arranging unit 331, a low resolution occupancy map identifying the presence or absence of patches in units of N×N pixels. The low resolution occupancy map generating unit 531 supplies the generated low resolution occupancy map (Occupancy map (N×N)) to the embedding unit 515 and the OMap encoding unit 521.

Note that these processing units (the patch arranging unit 331 to the Dilation processing unit 333 and low resolution occupancy map generating unit 531) have any configuration. For example, each processing unit may include a logic circuit configured to achieve the above-mentioned processing. Further, each processing unit may include, for example, a CPU, a ROM, or a RAM and execute a program using those portions, to thereby achieve the above-mentioned processing. Needless to say, each processing unit may have both the configurations, and achieve part of the above-mentioned processing by the logic circuit and achieve the remaining by executing the program. The configurations of the processing units may be independent of each other. For example, some of the processing units may achieve part of the above-mentioned processing by the logic circuits, other processing units may achieve the above-mentioned processing by executing the programs, and still other processing units may achieve the above-mentioned processing by using the logic circuits and executing the programs.

With the configuration as described above, the encoding apparatus 300 in this case can perform encoding as described above in <4. Locally High Resolution Occupancy Map>. Thus, the encoding apparatus 300 can obtain the various effects as described above in <4. Locally High Resolution Occupancy Map>. Thus, the encoding apparatus 300 can prevent, while preventing a reduction in encoding efficiency, a reduction in image quality of a display image obtained by projecting recovered 3D data on a two-dimensional plane.

<Flow of Encoding Processing>

Figure 24:
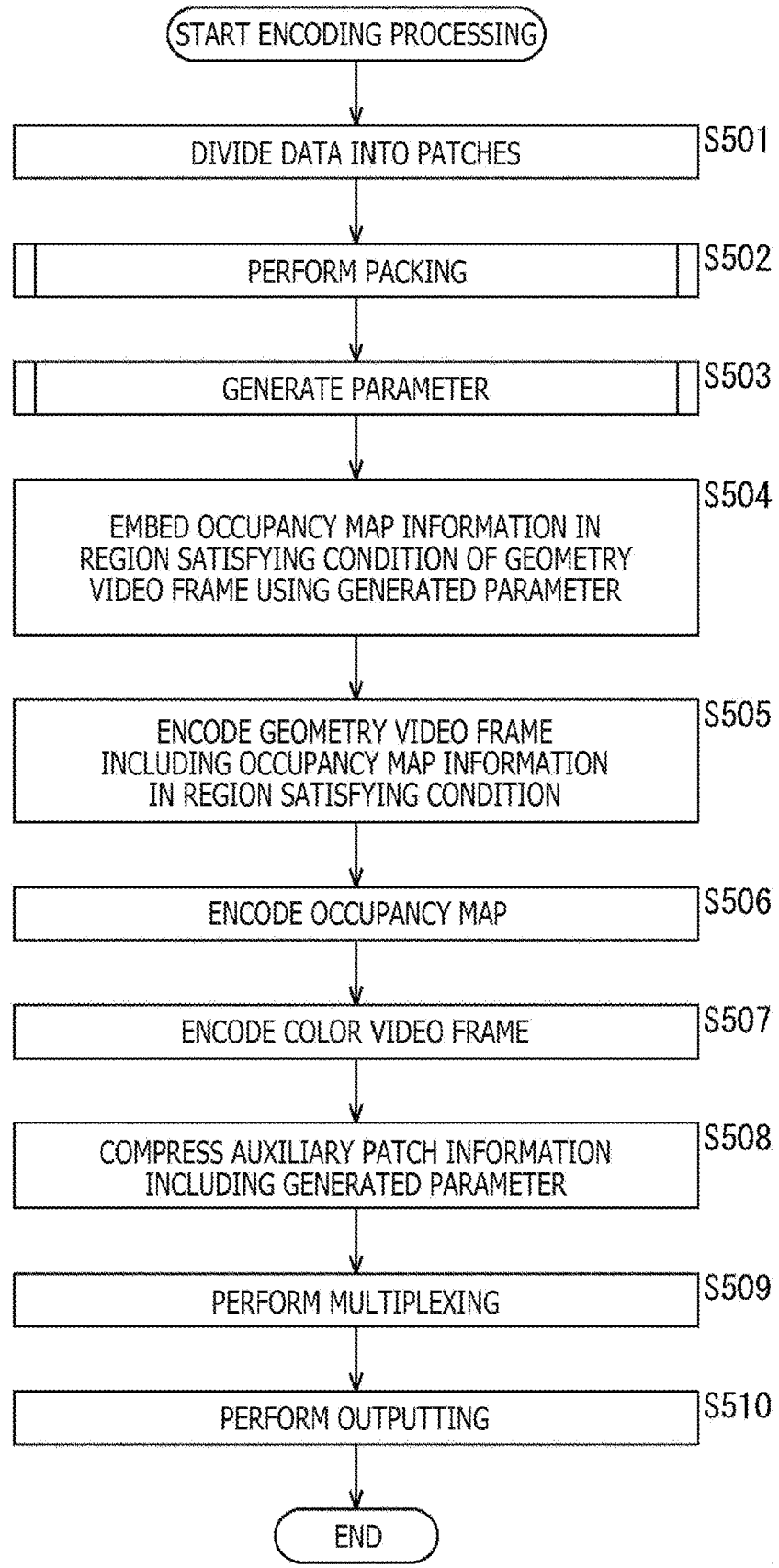
FIG. 24 is a flowchart illustrating an example of the flow of encoding processing.

Next, an example of the flow of encoding processing that is executed by the encoding apparatus 300 in this case is described with reference to the flowchart of FIG. 24.

When the encoding processing starts, in Step S501, the patch division unit 311 of the encoding apparatus 300 projects 3D data on a two-dimensional plane to divide the 3D data into patches.

In Step S502, the packing unit 512 executes packing processing to pack the patches of position information and attribute information generated in Step S501 as video frames. Further, the packing unit 512 generates control information associated with the packing. Note that, in this case, the packing unit 512 generates a low resolution occupancy map in addition to performing the processing described with reference to the flowchart of FIG. 16.

In Step S503, the parameter generating unit 314, the embedding unit 515, the video encoding unit 316, and the OMap recovering unit 317 execute parameter setting processing to generate special value-related parameters.

In Step S504, the embedding unit 515 embeds, using the parameters generated by the processing in Step S503, the high resolution occupancy map generated by the processing in Step S502 in a region satisfying the predetermined conditions of the geometry video frame generated by the processing in Step S502.

In Step S505, the video encoding unit 316 encodes the geometry video frame including the occupancy map information in the region satisfying the predetermined conditions, which has been generated by the processing in Step S504.

In Step S506, the OMap encoding unit 521 encodes the low resolution occupancy map generated by the processing in Step S502.

In Step S507, the video encoding unit 318 encodes the color video frame generated by the processing in Step S502.

In Step S508, the auxiliary patch information compressing unit 313 compresses the auxiliary patch information generated by the processing in Step S501 and the parameters generated by the processing in Step S503.

In Step S509, the multiplexer 319 multiplexes the various types of information generated as described above (for example, the encoded data generated in Step S505 to Step S508, and the control information associated with packing, which is generated in Step S502), to thereby generate a bitstream including these pieces of information.

In Step S510, the multiplexer 319 outputs the bitstream generated in Step S509 to the outside of the encoding apparatus 300.

When the processing in Step S510 ends, the encoding processing ends.

By executing the processing as described above, the encoding apparatus 300 in this case can perform encoding as described above in <4. Locally High Resolution Occupancy Map>. Thus, the encoding apparatus 300 can obtain the various effects as described above in <4. Locally High Resolution Occupancy Map>. Thus, the encoding apparatus 300 can prevent, while preventing a reduction in encoding efficiency, a reduction in image quality of a display image obtained by projecting recovered 3D data on a two-dimensional plane.

6. Fourth Embodiment

<Decoding Apparatus>

Figure 25:
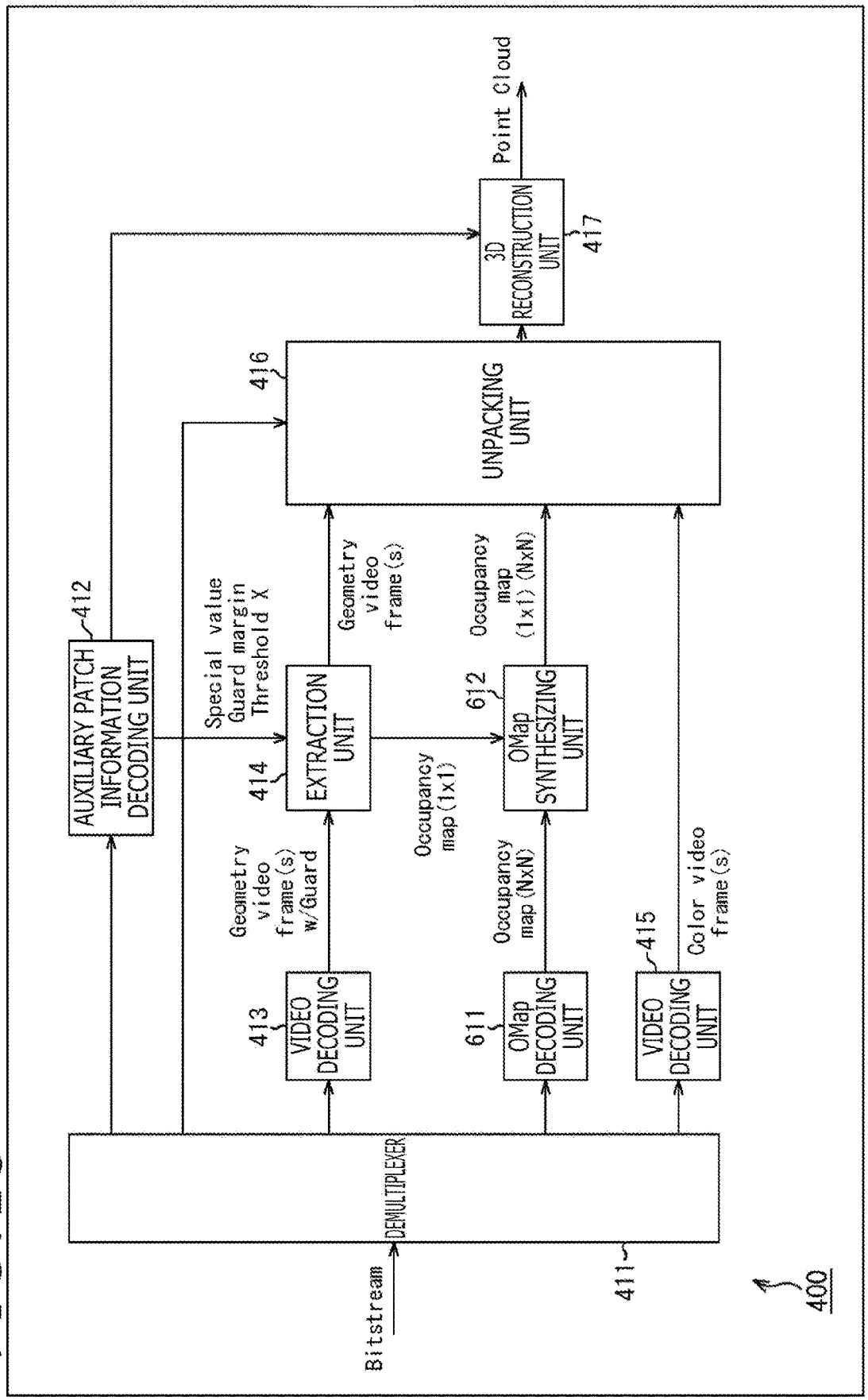
FIG. 25 is a block diagram illustrating an example of a main configuration of the decoding apparatus.

FIG. 25 is a block diagram illustrating an example of the configuration of the decoding apparatus 400 in this case. The decoding apparatus 400 illustrated in FIG. 25 is a decoding apparatus corresponding to the encoding apparatus 300 of FIG. 22 and can decode bitstreams generated by the encoding apparatus 300 to reconstruct 3D data.

The decoding apparatus 400 in this case includes, in addition the configuration of the example of FIG. 19, an OMap decoding unit 611 and an OMap synthesizing unit 612.

The demultiplexer 411 in this case also extracts encoded data on a low resolution occupancy map from a bitstream by inverse multiplexing and supplies the encoded data to the OMap decoding unit 611.

The OMap decoding unit 611 performs processing related to the decoding of occupancy maps. For example, the OMap decoding unit 611 acquires encoded data supplied from the demultiplexer 411. Further, the OMap decoding unit 611 decodes the encoded data to generate a low resolution occupancy map. Moreover, the OMap decoding unit 611 supplies the generated low resolution occupancy map (Occupancy map (N×N)) to the OMap synthesizing unit 612.

Further, the extraction unit 414 in this case also supplies a high resolution occupancy map (Occupancy map (1×1)) to the OMap synthesizing unit 612.

The OMap synthesizing unit 612 performs processing related to the synthesis of occupancy maps. For example, the OMap synthesizing unit 612 acquires a low resolution occupancy map supplied from the OMap decoding unit 611. Further, the OMap synthesizing unit 612 acquires a high resolution occupancy map supplied from the extraction unit 414. Moreover, the OMap synthesizing unit 612 synthesizes the high resolution occupancy map and the low resolution occupancy map. That is, the OMap synthesizing unit 612 generates a synthesized occupancy map (Occupancy map (1×1) (N×N)) having a certain region at the high resolution and the remaining region at the low resolution. The OMap synthesizing unit 612 supplies the generated synthesized occupancy map (Occupancy map (1×1) (N×N)) to the unpacking unit 416.

The unpacking unit 416 in this case unpacks a geometry video frame and a color video frame on the basis of a synthesized occupancy map (Occupancy map (1×1) (N×N)) supplied from the OMap synthesizing unit 612. Moreover, the unpacking unit 416 supplies the patches and the like of position information and attribute information obtained by the unpacking to the 3D reconstruction unit 417.

Note that these processing units (the demultiplexer 411 to the 3D reconstruction unit 417, the OMap decoding unit 611, and the OMap synthesizing unit 612) have any configuration. For example, each processing unit may include a logic circuit configured to achieve the above-mentioned processing. Further, each processing unit may include, for example, a CPU, a ROM, or a RAM and execute a program using those portions, to thereby achieve the above-mentioned processing. Needless to say, each processing unit may have both the configurations, and achieve part of the above-mentioned processing by the logic circuit and achieve the remaining by executing the program. The configurations of the processing units may be independent of each other. For example, some of the processing units may achieve part of the above-mentioned processing by the logic circuits, other processing units may achieve the above-mentioned processing by executing the programs, and still other processing units may achieve the above-mentioned processing by using the logic circuits and executing the programs.

With the configuration as described above, the decoding apparatus 400 in this case can perform decoding as described above in <4. Locally High Resolution Occupancy Map>. Thus, the decoding apparatus 400 can obtain the various effects as described above in <4. Locally High Resolution Occupancy Map>. Thus, the decoding apparatus 400 can prevent, while preventing a reduction in encoding efficiency, a reduction in image quality of a display image obtained by projecting recovered 3D data on a two-dimensional plane.

<Flow of Decoding Processing>

Next, an example of the flow of decoding processing that is executed by the decoding apparatus 400 in this case is described with reference to the flowcharts of FIG. 26 and FIG. 27.

Figure 26:
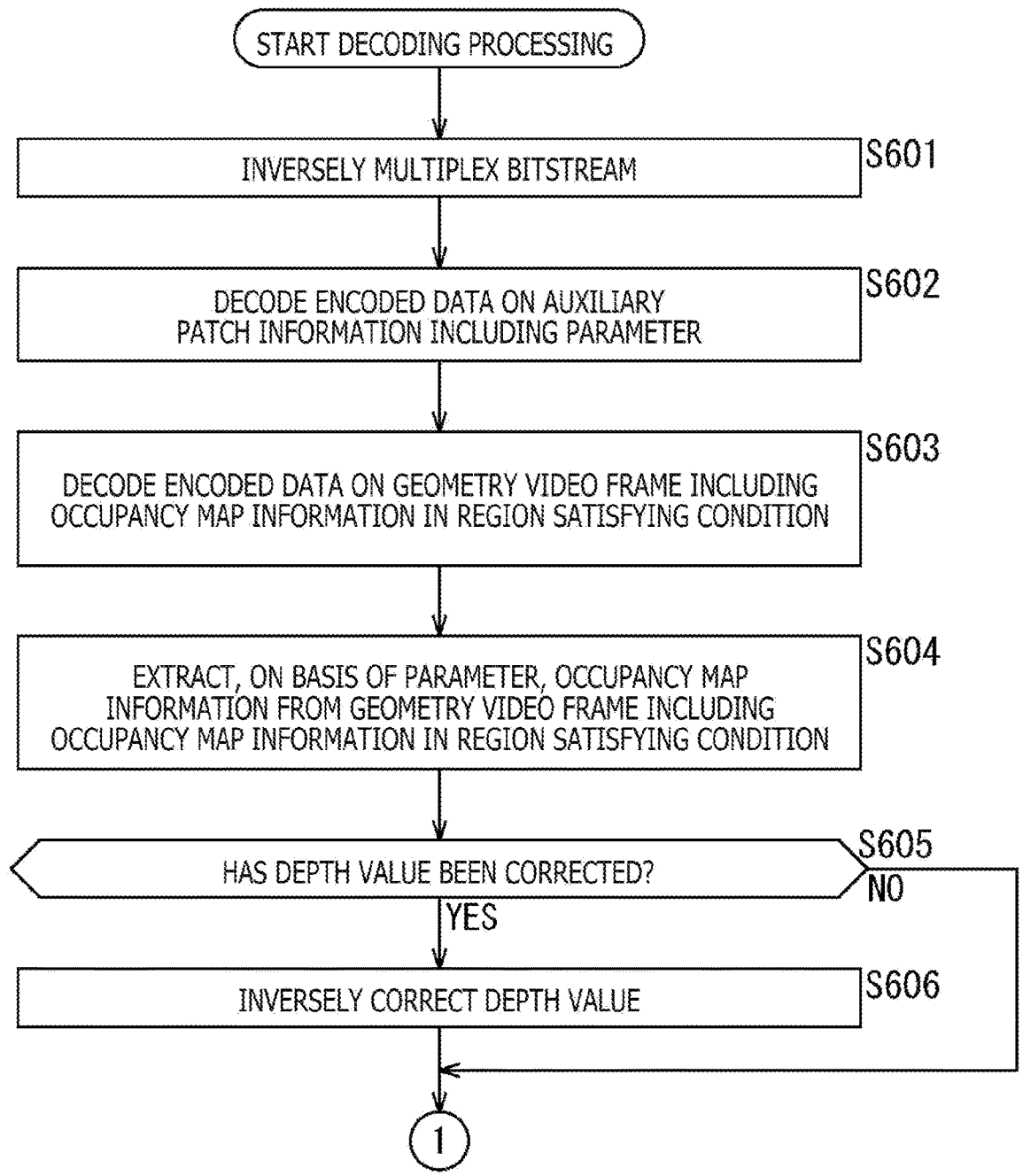
FIG. 26 is a flowchart illustrating an example of the flow of decoding processing.

When the decoding processing starts, in Step S601 of FIG. 26, the demultiplexer 411 of the decoding apparatus 400 inversely multiplexes a bitstream.

In Step S602, the auxiliary patch information decoding unit 412 decodes encoded data extracted from the bitstream by the processing in Step S601, to thereby generate auxiliary patch information.

In Step S603, the video decoding unit 413 decodes the encoded data extracted from the bitstream by the processing in Step S601, to thereby generate a geometry video frame including occupancy map information in a region satisfying the conditions.

In Step S604, the extraction unit 414 extracts, using special value-related parameters included in the auxiliary patch information generated in Step S602, the occupancy map information from the geometry video frame including the occupancy map information in the region satisfying the conditions, which has been generated by the processing in Step S603, to thereby generate a high resolution occupancy map and a geometry video frame including no occupancy map information (Geometry video frame(s)).

In Step S605, the extraction unit 414 determines, on the basis of the special value-related parameters or the like, whether or not the depth values have been corrected in encoding. For example, in a case where it is determined that the depth values have been corrected, the processing proceeds to Step S606.

In Step S606, the extraction unit 414 inversely corrects the depth values. When the processing in Step S606 ends, the processing proceeds to Step S611 of FIG. 27. Further, in a case where it is determined in Step S605 of FIG. 26 that the depth values have not been corrected, the processing in Step S606 is skipped, and the processing proceeds to Step S611 of FIG. 27.

In Step S611, the OMap decoding unit 611 decodes the encoded data extracted from the bitstream in Step S601, to thereby generate a low resolution occupancy map.

Figure 27:
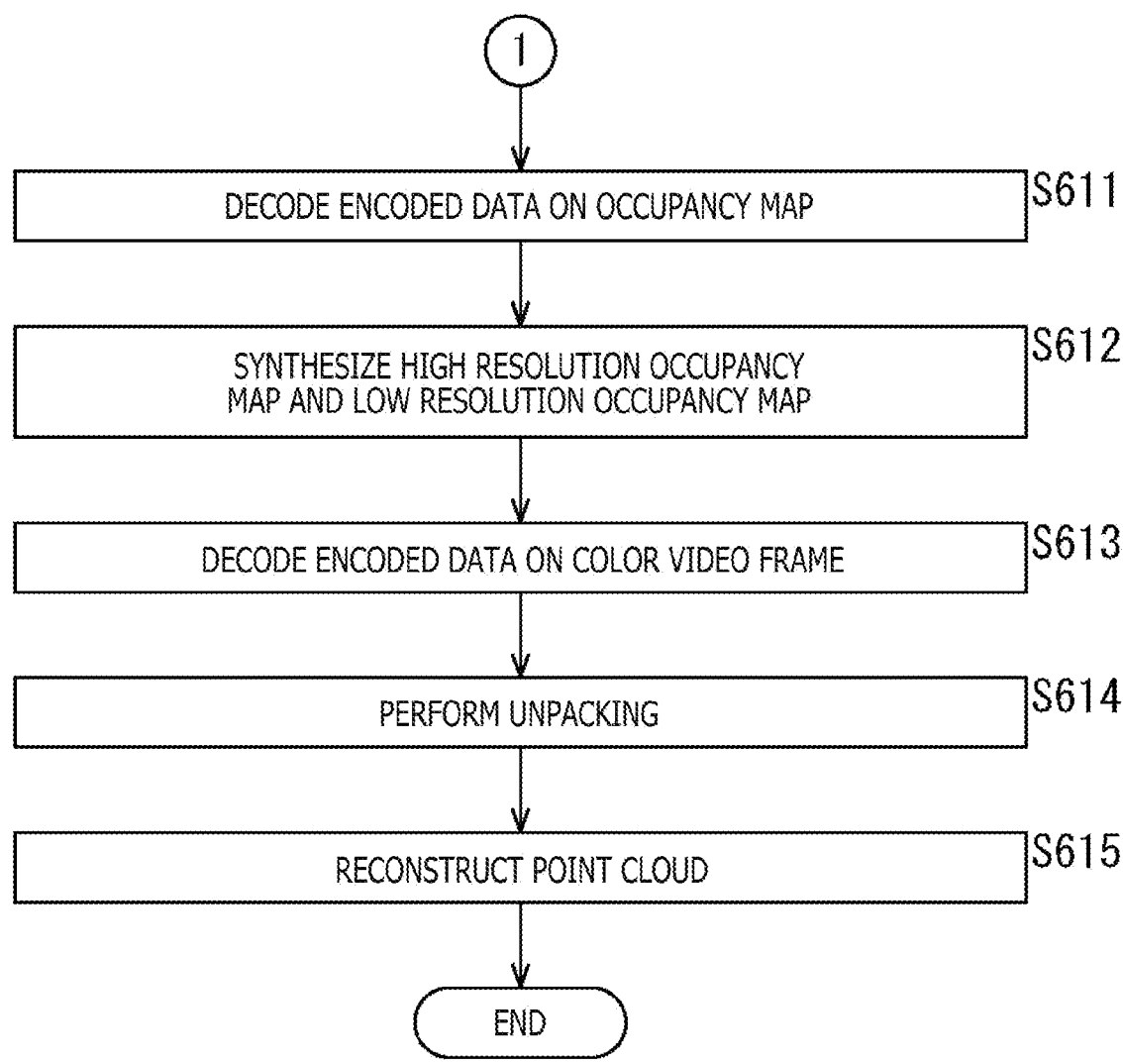
FIG. 27 is a flowchart illustrating an example of the flow of the decoding processing, which is a continuation of FIG. 26.

In Step S612, the OMap synthesizing unit 612 synthesizes the high resolution occupancy map generated by the processing in Step S604 of FIG. 26, and the low resolution occupancy map generated by the processing in Step S611 of FIG. 27, to thereby generate a synthesized occupancy map.

In Step S613, the video decoding unit 415 decodes the encoded data extracted from the bitstream in Step S601, to thereby generate a color video frame.

In Step S614, the unpacking unit 416 unpacks the geometry video frame and the color video frame, to thereby extract patches.

In Step S615, the 3D reconstruction unit 417 reconstructs 3D data such as a point cloud using, for example, the patches extracted by the processing in Step S614.

When the processing in Step S615 ends, the decoding processing ends.

By executing the processing as described above, the decoding apparatus 400 in this case can perform decoding as described above in <4. Locally High Resolution Occupancy Map>. Thus, the decoding apparatus 400 can obtain the various effects as described above in <4. Locally High Resolution Occupancy Map>. Thus, the decoding apparatus 400 can prevent, while preventing a reduction in encoding efficiency, a reduction in image quality of a display image obtained by projecting recovered 3D data on a two-dimensional plane.

7. Note

<Control Information>

Control information associated with the present technology described in the embodiments above may be transmitted from the encoding side to the decoding side. For example, control information for controlling whether or not to permit (or prohibit) the application of the present technology described above (for example, enabled_flag) may be transmitted. Further, for example, control information for specifying a range to which the application of the present technology described above is permitted (or prohibited) (for example, the upper limit or the lower limit, or both the limits of block sizes, slices, pictures, sequences, components, views, layers, or the like) may be transmitted.

<Computer>

The series of processing processes described above can be executed by hardware or software. In a case where the series of processing processes is executed by software, a program configuring the software is installed on a computer. Here, examples of the computer include computers incorporated in dedicated hardware and general-purpose personal computers capable of executing various functions with various programs installed thereon.

Figure 28:
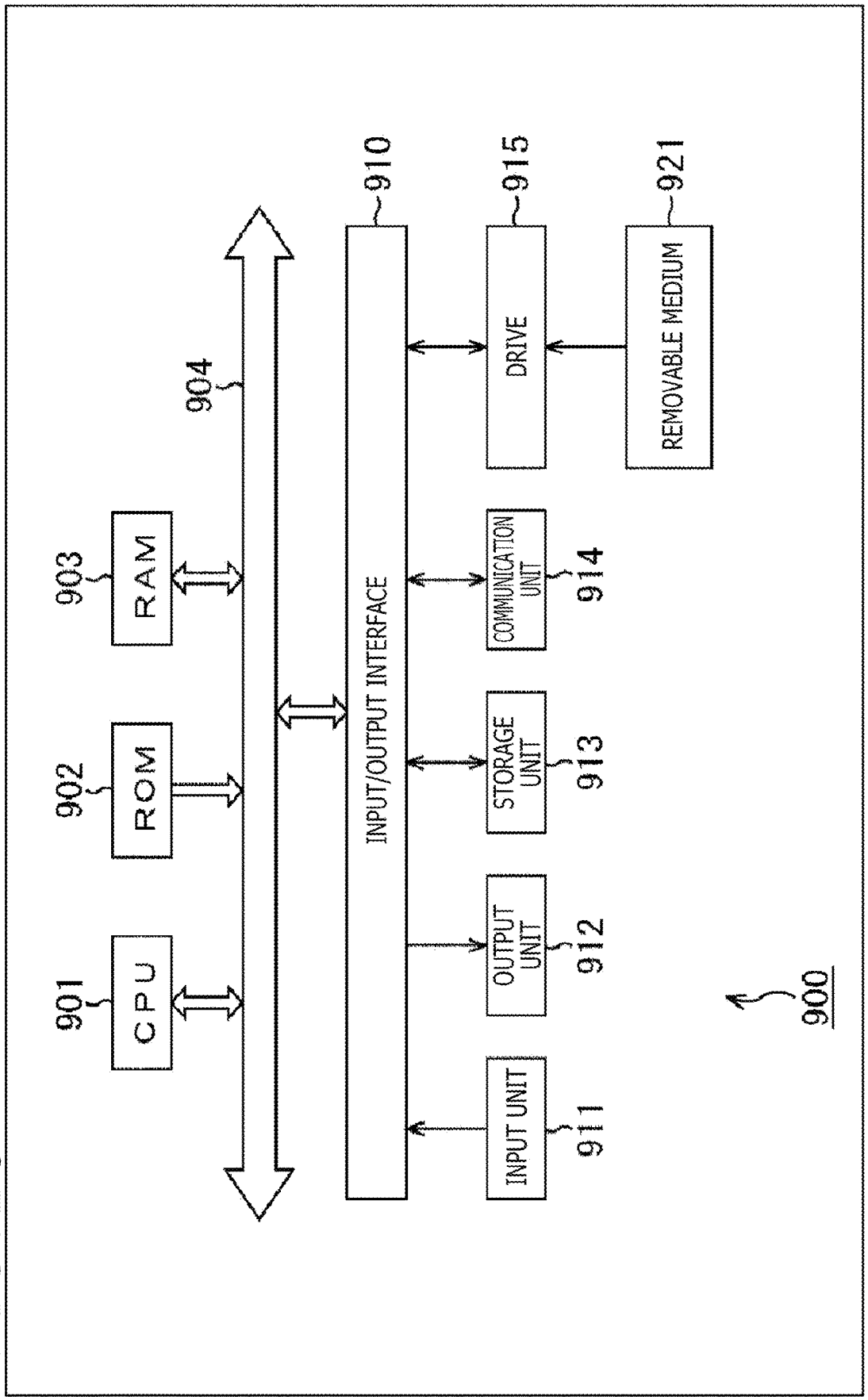
FIG. 28 is a block diagram illustrating an example of a main configuration of a computer.

FIG. 28 is a block diagram illustrating a configuration example of the hardware of a computer configured to execute the above-mentioned series of processing processes with the program.

In a computer 900 illustrated in FIG. 28, a CPU (Central Processing Unit) 901, a ROM (Read Only Memory) 902, and a RAM (Random Access Memory) 903 are connected to each other through a bus 904.

An input/output interface 910 is further connected to the bus 904. To the input/output interface 910, an input unit 911, an output unit 912, a storage unit 913, a communication unit 914, and a drive 915 are connected.

The input unit 911 includes a keyboard, a mouse, a microphone, a touch panel, an input terminal, etc. The output unit 912 includes a display, a speaker, an output terminal, etc. The storage unit 913 includes a hard disk, a RAM disk, a non-volatile memory, etc. The communication unit 914 includes a network interface, etc. The drive 915 drives a removable medium 921 such as a magnetic disk, an optical disc, a magneto-optical disk, or a semiconductor memory.

In the computer configured as described above, for example, the CPU 901 loads the program stored in the storage unit 913 into the RAM 903 through the input/output interface 910 and the bus 904 and executes the program to perform the series of processing processes described above. In the RAM 903, data necessary for the CPU 901 to execute various types of processing is further stored as appropriate.

The program that is executed by the computer can be recorded on the removable medium 921 which is a package medium or the like, to be applied, for example. In this case, the program can be installed on the storage unit 913 through the input/output interface 910 with the removable medium 921 mounted on the drive 915.

Further, the program can be provided through a wired or wireless transmission medium such as a local area network, the Internet, or digital satellite broadcasting. In this case, the program can be received by the communication unit 914 to be installed on the storage unit 913.

Besides, the program can be installed on the ROM 902 or the storage unit 913 in advance.

<Application Target of Present Technology>

In the above, the case where the present technology is applied to the encoding and decoding of point cloud data has been described, but the present technology is applicable not only to these examples, but also to the encoding and decoding of 3D data in accordance with any standard. That is, unless there is no contradiction to the present technology described above, various types of processing such as encoding and decoding methods and the specifications of various types of data such as 3D data and metadata are used as desired. Further, unless there is no contradiction to the present technology, the processing or specifications described above may be partly omitted.

Further, in the above, the encoding apparatus 300 and the decoding apparatus 400 have been described as the application examples of the present technology, but the present technology is applicable to any configuration.

For example, the present technology is applicable to various electronic appliances such as transmitters and receivers for satellite broadcasting, cable broadcasting such as cable television, distribution on the Internet, and distribution to terminals via cellular communication (for example, television receivers or cell phones), and apparatus configured to record images in media such as optical discs, magnetic disks, or flash memories, and reproduce images from such storage media (for example, hard disk recorders and cameras).

Further, for example, the present technology can also be implemented as a part of an apparatus, such as a processor serving as a system LSI (Large Scale Integration) or the like (for example, a video processor), a module that uses a plurality of processors or the like (for example, a video module), a unit that uses a plurality of modules or the like (for example, a video unit), or a set that includes other additional functions in addition to a unit (for example, a video set).

Further, for example, the present technology is also applicable to a network system including a plurality of apparatus. For example, the present technology may be implemented as cloud computing in which a function is shared and processed by a plurality of apparatus via a network. For example, the present technology may be implemented in cloud service for providing image (moving image)-related service to any terminal such as computers, AV (Audio Visual) equipment, portable information processing terminals, or IoT (Internet of Things) devices.

Note that a system herein means a set of a plurality of components (apparatus, module (part), or the like), and it does not matter whether or not all the components are in a single housing. Thus, a plurality of apparatuses that is accommodated in separate housings and connected to each other via a network, and a single apparatus in which a plurality of modules is accommodated in a single housing are both systems.

<Fields and Purposes to which Present Technology is Applicable>

A system, an apparatus, a processing unit, and the like to which the present technology has been applied can be used in any field, for example, traffic, medical care, crime prevention, agriculture, the livestock industry, the mining industry, beauty, factories, home electronics, weather, or natural surveillance. Further, a system, an apparatus, a processing unit, and the like described above can be used for any purpose.

<Others>

Note that a "flag" herein is information for identifying a plurality of states and includes not only information that is used for identifying two states of true (1) and false (0), but also information that allows the identification of three or more states. Thus, the possible values of the "flag" may be, for example, two values of I/O or three or more values. That is, the "flag" has any number of bits and may have one bit or a plurality of bits. Further, as for identification information (including a flag), the identification information may be included in a bitstream, or difference information regarding the identification information with respect to information serving as a reference may be included in the bitstream. Thus, the "flag" and the "identification information" herein include not only information regarding the "flag" or the "identification information," but also difference information with respect to information serving as a reference.

Further, various types of information regarding encoded data (bitstream) (such as metadata) may be transmitted or recorded in any form as long as the information is associated with the encoded data. Here, the term "associate" means, for example, that one piece of data may be used (may be linked) during the processing of another piece of data. That is, data associated with each other may be integrated as one piece of data or provided as separate pieces of data. For example, information associated with encoded data (image) may be transmitted on a transmission path different from the one for the encoded data (image). Further, for example, information associated with encoded data (image) may be recorded on a recording medium different from the one for the encoded data (image) (or in a different recording area of the same recording medium). Note that data may be partly "associated" with each other, rather than entirely. For example, an image and information corresponding to the image may be associated with each other in any unit, such as a plurality of frames, a single frame, or part of a frame.

Note that the terms herein such as "synthesize," "multiplex," "add," "integrate," "include," "store," "put in," "place into," and "insert" each mean grouping a plurality of things, such as grouping encoded data and metadata, into one. The terms each mean one method of "associate" described above.

Further, the embodiments of the present technology are not limited to the embodiments described above, and various modifications can be made without departing from the gist of the present technology.

For example, the configuration described as a single apparatus (or processing unit) may be divided to be configured as a plurality of apparatus (or processing units). In contrast, the configurations described above as a plurality of apparatuses (or processing units) may be combined to be configured as a single apparatus (or processing unit). Further, needless to say, a configuration other than the above-mentioned configurations may be added to the configuration of each apparatus (or each processing unit). Moreover, the configuration of a certain apparatus (or processing unit) may be partly included in the configuration of another apparatus (or another processing unit) as long as the configuration and operation as the entire system are substantially unchanged.

Further, for example, the program described above may be executed by any apparatus. In this case, it is enough that the apparatus has necessary functions (functional blocks or the like) and can thus obtain necessary information.

Further, for example, the steps of a single flowchart may be executed by a single apparatus or shared and executed by a plurality of apparatuses. Moreover, in a case where a plurality of pieces of processing is included in a single step, the plurality of pieces of processing may be executed by a single apparatus or shared and executed by a plurality of apparatuses. In other words, a plurality of pieces of processing included in a single step can be executed as processing in a plurality of steps. In contrast, the processing described as a plurality of steps can be collectively executed as a single step.

Further, for example, as for the program that is executed by the computer, the pieces of processing in the steps describing the program may be executed chronologically in the order described herein or in parallel. Alternatively, the pieces of processing may be individually executed at right timings, for example, when the program is called. That is, unless there is no contradiction, the pieces of processing in the respective steps may be executed in an order different from the order described above. Moreover, the pieces of processing in the steps describing the program may be executed in parallel with the processing of another program, or may be executed in combination with the processing of another program.

Further, for example, the plurality of technologies according to the present technology can be implemented independently of each other or solely unless there is no contradiction. Needless to say, the plurality of present technologies can be implemented in any combination. For example, the entire or part of the present technology described in any of the embodiments can be implemented in combination with the entire or part of the present technology described in another embodiment. Further, the entire or part of any of the present technologies described above can be implemented in combination with another technology not described above.

Note that the present technology can also take the following configurations.

(1)
An image processing apparatus including:
a geometry data generating unit configured to generate geometry data that is a frame image having arranged thereon a projected image obtained by projecting 3D data representing a three-dimensional structure on a two-dimensional plane and includes a special value indicating occupancy map information in a range; and
an encoding unit configured to encode the geometry data generated by the geometry data generating unit.

(2)
The image processing apparatus according to Item (1), in which the special value indicates that the projected image is not present.

(3)
The image processing apparatus according to Item (1) or (2), further including:
a special value setting unit configured to set the special value in the range of the geometry data,
in which the geometry data generating unit generates the geometry data including, in the range, the special value set by the special value setting unit.

(4)
The image processing apparatus according to Item (3), in which the special value setting unit sets, as the special value, at least one of a minimum value, a maximum value, or an intermediate value of the range of the geometry data.

(5)
The image processing apparatus according to any one of Items (1) to (4), further including:
a margin setting unit configured to set a margin having a predetermined width between a range indicating a depth value indicating a position of the 3D data and the special value in the range of the geometry data,
in which the geometry data generating unit generates the geometry data including, in the range, the special value and the margin set by the margin setting unit.

(6)
The image processing apparatus according to any one of Items (1) to (5), further including:
a threshold setting unit configured to set a threshold for identifying a depth value indicating a position of the 3D data and the special value.

(7)
The image processing apparatus according to Item (6), further including:
a decoding unit configured to decode encoded data generated by the encoding unit from the geometry data,
in which the threshold setting unit sets the threshold, based on the geometry data generated by the decoding unit from the encoded data.

(8)
The image processing apparatus according to any one of Items (1) to (7), in which the geometry data generating unit corrects a range of a depth value indicating a position of the 3D data and generates the geometry data including the special value in the range.

(9)
The image processing apparatus according to Item (8), in which the geometry data generating unit quantizes or shifts the depth value to correct the range of the depth value.

(10)
The image processing apparatus according to any one of Items (1) to (9), further including:
a bitstream generating unit configured to generate a bitstream including encoded data generated by the encoding unit from the geometry data and a parameter associated with the special value.

(11)
The image processing apparatus according to Item (10), in which the parameter includes at least one of information indicating the special value, information indicating a margin between a range indicating a depth value indicating a position of the 3D data and the special value, or information indicating a threshold for identifying the depth value and the special value.

(12)
The image processing apparatus according to Item (10) or (11), in which the bitstream generating unit generates the bitstream including the parameter in units of patches, frames, or sequences.

(13)
The image processing apparatus according to any one of Items (1) to (12), in which the geometry data generating unit generates geometry data including the special value in a range of data in a certain region satisfying a predetermined condition of the frame image.

(14)
The image processing apparatus according to Item (13), in which the geometry data generating unit generates the geometry data including the special value in a range of data in a region based on occupancy map information at a resolution lower than the geometry data.

(15)
An image processing method including:
generating geometry data that is a frame image having arranged thereon a projected image obtained by projecting 3D data representing a three-dimensional structure on a two-dimensional plane and includes a special value indicating occupancy map information in a range; and
encoding the geometry data generated.

(16)
An image processing apparatus including:
a decoding unit configured to decode encoded data on geometry data that is a frame image having arranged thereon a projected image obtained by projecting 3D data representing a three-dimensional structure on a two-dimensional plane and includes a special value indicating occupancy map information in a range; and
an extraction unit configured to extract, from the geometry data generated by the decoding unit from the encoded data, a depth value indicating a position of the 3D data, and the occupancy map information.

(17)
The image processing apparatus according to Item (16), in which the extraction unit extracts the depth value and the special value, based on a parameter associated with the special value.

(18)
The image processing apparatus according to Item (16) or (17), in which the extraction unit corrects a range of the depth value extracted.

(19)
The image processing apparatus according to any one of Items (16) to (18), further including:
a synthesis unit configured to synthesize the occupancy map information extracted by the extraction unit and occupancy map information at a resolution lower than the occupancy map information.

(20) An image processing method including:

decoding encoded data on geometry data that is a frame image having arranged thereon a projected image obtained by projecting 3D data representing a three-dimensional structure on a two-dimensional plane and includes a special value indicating occupancy map information in a range; and extracting, from the geometry data generated from the encoded data, a depth value indicating a position of the 3D data, and the occupancy map information.

REFERENCE SIGNS LIST

300: Encoding apparatus
311: Patch division unit
312: Packing unit
313: Auxiliary patch information compressing unit
314: Parameter generating unit
315: Embedding unit
316: Video encoding unit
317: OMap recovering unit
318: Video encoding unit
319: Multiplexer
331: Patch arranging unit
332: High resolution occupancy map generating unit
333: Dilation processing unit
400: Decoding apparatus
411: Demultiplexer
412: Auxiliary patch information decoding unit
413: Video decoding unit
414: Extraction unit
415: Video decoding unit
416: Unpacking unit
417: 3D reconstruction unit
512: Packing unit
515: Embedding unit
521: OMap encoding unit
531: Low resolution occupancy map generating unit
611: OMap decoding unit
612: OMap synthesizing unit

The invention claimed is:

1. An image processing apparatus comprising:
circuitry configured to:
project 3D data representing a three-dimensional structure on a two-dimensional plane to obtain a projected image;
generate geometry data including
a frame image on which the projected image is arranged, and
a special value indicating first occupancy map information in a range; and
encode the geometry data.

2. The image processing apparatus according to claim 1, wherein the special value indicates that the projected image is not present.

3. The image processing apparatus according to claim 1, wherein the circuitry is further configured to:
set the special value in the range of the geometry data; and
generate the geometry data including the special value in the range.

4. The image processing apparatus according to claim 3, wherein the circuitry is further configured to set, as the special value, at least one of a minimum value, a maximum value, or an intermediate value of the range of the geometry data.

5. The image processing apparatus according to claim 1, wherein the circuitry is further configured to:
set a margin having a predetermined width between a range indicating a depth value indicating a position of the 3D data and the special value in the range of the geometry data; and
generate the geometry data including the special value and the margin in the range.

6. The image processing apparatus according to claim 1, wherein the circuitry is further configured to set a threshold for identifying a depth value indicating a position of the 3D data and the special value.

7. The image processing apparatus according to claim 6, wherein the circuitry is further configured to:
decode the encoded geometry data; and
set the threshold based on the decoded geometry data.

8. The image processing apparatus according to claim 1, wherein the circuitry is further configured to correct a range of a depth value indicating a position of the 3D data to generate the geometry data including the special value in the corrected range.

9. The image processing apparatus according to claim 8, wherein the circuitry is further configured to quantize or shift the depth value to correct the range of the depth value.

10. The image processing apparatus according to claim 1, wherein the circuitry is further configured to generate a bitstream including the encoded geometry data and a parameter associated with the special value.

11. The image processing apparatus according to claim 10, wherein the parameter includes at least one of information indicating the special value, information indicating a margin between a range indicating a depth value indicating a position of the 3D data and the special value, or information indicating a threshold for identifying the depth value and the special value.

12. The image processing apparatus according to claim 10, wherein the circuitry is further configured to generate the bitstream including the parameter in units of patches, frames, or sequences.

13. The image processing apparatus according to claim 1, wherein the circuitry is further configured to generate geometry data including the special value in a range of data in a certain region satisfying a predetermined condition of the frame image.

14. The image processing apparatus according to claim 13, wherein the circuitry is further configured to generate the geometry data including the special value in a range of data in a region based on second occupancy map information having a resolution lower than that of the first occupancy map information of the geometry data.

15. An image processing method, comprising:
projecting 3D data representing a three-dimensional structure on a two-dimensional plane to obtain a projected image;
generating geometry data including
a frame image on which the projected image is arranged, and
a special value indicating occupancy map information in a range; and
encoding the geometry data.

16. An image processing apparatus, comprising:
circuitry configured to:
- decode encoded data on geometry data including
  - a frame image on which a projected image of 3D data on a two-dimensional plane is arranged, the 3D data representing a three-dimensional structure, and
  - a special value indicating first occupancy map information in a range; and
- extract, from the geometry data, a depth value indicating a position of the 3D data and the first occupancy map information.

17. The image processing apparatus according to claim 16, wherein the circuitry is further configured to extract the depth value and the special value, based on a parameter associated with the special value.

18. The image processing apparatus according to claim 16, wherein the circuitry is further configured to correct a range of the depth value.

19. The image processing apparatus according to claim 16, wherein the circuitry is further configured to synthesize the first occupancy map information and second occupancy map information having a resolution lower than that of the first occupancy map information.

20. An image processing method, comprising:
- decoding encoded data on geometry data including
  - a frame image on which a projected image of 3D data on a two-dimensional plane is arranged, the 3D data representing a three-dimensional structure, and
  - a special value indicating occupancy map information in a range; and
- extracting, from the geometry data, a depth value indicating a position of the 3D data and the occupancy map information.

* * * * *